(12) United States Patent
Suzuki et al.

(10) Patent No.: US 8,881,158 B2
(45) Date of Patent: Nov. 4, 2014

(54) SCHEDULE DECISION DEVICE, PARALLEL EXECUTION DEVICE, SCHEDULE DECISION METHOD, AND PROGRAM

(75) Inventors: Noriaki Suzuki, Tokyo (JP); Junji Sakai, Tokyo (JP)

(73) Assignee: NEC Corporation, Tokyo (JP)

( * ) Notice: Subject to any disclaimer, the term of this patent is extended or adjusted under 35 U.S.C. 154(b) by 390 days.

(21) Appl. No.: 13/063,232

(22) PCT Filed: Aug. 20, 2009

(86) PCT No.: PCT/JP2009/064541
§ 371 (c)(1),
(2), (4) Date: Mar. 10, 2011

(87) PCT Pub. No.: WO2010/055719
PCT Pub. Date: May 20, 2010

(65) Prior Publication Data
US 2011/0209153 A1    Aug. 25, 2011

(30) Foreign Application Priority Data

Nov. 14, 2008    (JP) .................................. 2008-292119

(51) Int. Cl.
*G06F 9/46*    (2006.01)
*G06F 9/50*    (2006.01)

(52) U.S. Cl.
CPC ...... *G06F 9/5038* (2013.01); *G06F 2209/5017* (2013.01); *G06F 2209/506* (2013.01)
USPC .......................................... 718/102; 718/104

(58) Field of Classification Search
None
See application file for complete search history.

(56) References Cited

FOREIGN PATENT DOCUMENTS

| JP | 9-54699 A | 2/1997 |
|---|---|---|
| JP | 9-218861 A | 8/1997 |
| JP | 2001-195265 A | 7/2001 |
| JP | 2001195265 A | 7/2001 |
| JP | 2002207510 A | 7/2002 |
| JP | 2004185271 A | 7/2004 |
| JP | 4016010 B | 12/2007 |
| JP | 4082706 B | 4/2008 |

OTHER PUBLICATIONS

Wang et al., Task Matching and Scheduling in Heterogeneous Computing Environments Using a Genetic-Algorithm-Based Approach, Nov. 25, 1997, Academic Press Inc., Journal of Parallel and Distributed Computing, vol. 47 (Issue 1), pp. 8-22.*

(Continued)

*Primary Examiner* — Lewis A Bullock, Jr.
*Assistant Examiner* — Melissa Alfred
(74) *Attorney, Agent, or Firm* — Sughrue Mion, PLLC

(57) ABSTRACT

A schedule decision method acquires dependencies of execution sequences required for a plurality of sub tasks into which a first task has been divided; generates a plurality of sub task structure candidates that satisfy said dependencies and for which a plurality of processing devices execute said plurality of sub tasks; generates a plurality of schedule candidates by further assigning at least one second task to each of said sub task structure candidates; computes an effective degree that represents effectiveness of executions of said first task and said second task for each of said plurality of schedule candidates; and decides a schedule candidate used for the executions of said first task and said second task from said plurality of schedule candidates based on said effective degrees.

4 Claims, 27 Drawing Sheets

(56) References Cited

OTHER PUBLICATIONS

Atkins et al., Planning and Resource Allocation for Hard Real-time, Fault-Tolerant Plan Execution, Mar.-Jun. 2001, Kulwer Academic Publishers, Autonomous Agents and Multi-Agent Sstems, vol. 4 (Issues 1-2), pp. 57-78.*

International Search Report for PCT/JP2009/064541 mailed Sep. 15, 2009.

T. Osada et al., "Application of Genetic-Algorithm-Based Method to Scheduling Parallel Programs Using Task Duplication", IEICE Technical Report, vol. 96, No. 348, Nov. 6, 1996, pp. 17-24.

Tetsuya Osada et al., "Application of Genetic-Algorithm-Based Method to Scheduling Parallel Programs Using Task Duplication", The Institute of Electronics, Information and Communication Engineers, Technical Report of IEICE, 1998-00377-003, SS96-30, Nov. 1996, pp. 17-24. Concise English language Explanation found in Japanese Office Action (Non-Patent Literature Documents No. 2) and ISR (Non-Patent Literature Documents No. 3).

Japanese Office Action for JP 2010-537726 mailed on Jun. 11, 2013 with Partial English Translation.

International Search Report for PCT/JP2009/064541 mailed on Sep. 15, 2009.

* cited by examiner

Fig.5
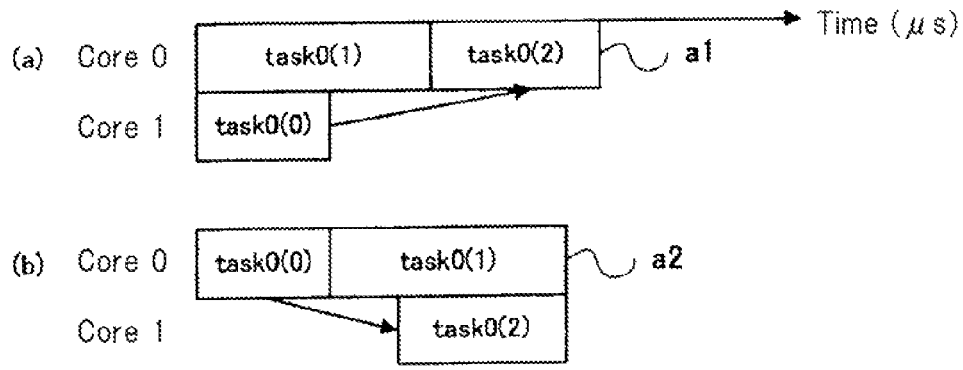
Fig.6
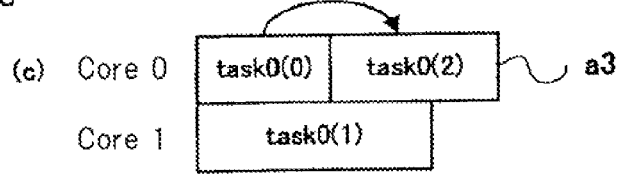
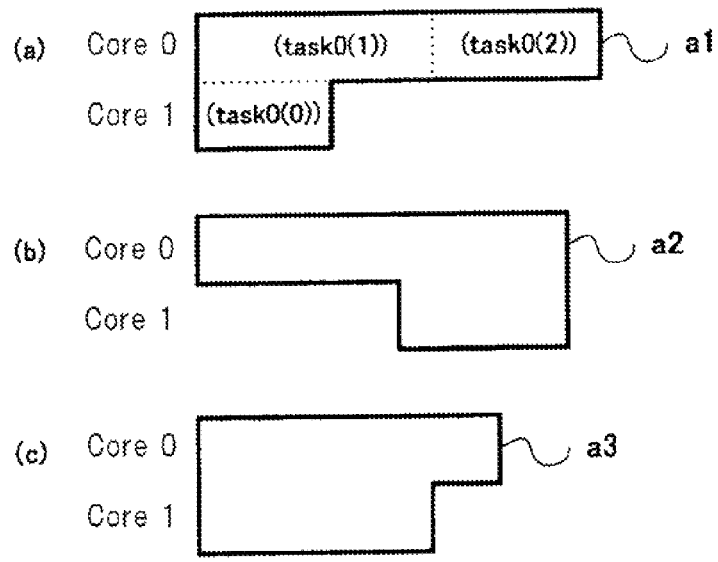
Fig.7
| Task structure candidates ||||
| Candidate number | Execution time of core 0 (ms) | Execution time of core 1 (ms) | Offset ($\mu$s) |
| --- | --- | --- | --- |
| a1 | 60 | 20 | — |
| a2 | 55 | 25 | 30 |
| a3 | 45 | 35 | — |

| Exemplary computations of effective degree scores (computation period : 400 ms) | | | | | | |
|---|---|---|---|---|---|---|
| Candidate No. | Task type | Average tolerance degree | Average interruption time (ms) | Average jitter (ms) | ... | Effective degree score |
| a1 | Task0 | 0.25 | 0 | 0 | ... | 0.75 |
| | Task1 | 0.35 | 20 | 10 | ... | |
| a2 | Task0 | 0.32 | 0 | 0 | ... | 0.92 |
| | Task1 | 0.44 | 25 | 7.5 | ... | |
| a3 | Task0 | 0.44 | 0 | 0 | ... | 1.05 |
| | Task1 | 0.34 | 35 | 17.5 | ... | |
| ⋮ | ⋮ | ⋮ | ⋮ | ⋮ | ⋮ | ⋮ |

Fig.19

| Results of scheduling ||||
|---|---|---|---|
| Candidate No. | Execution time of core 0 ($\mu s$) | Execution time of core 1 ($\mu s$) | Offset ($\mu s$) |
| 11 | 101 | 0 | - |
| 12 | 60 | 41 | 20 |
| 13 | 79 | 22 | 20 |
| 14 | 94 | 7 | 20 |
| 15 | 90 | 11 | 20 |
| 16 | 38 | 63 | 20 |
| 17 | - | - | - |
| 18 | 49 | 52 | 20 |
| 19 | 72 | 29 | 20 |
| 20 | - | - | - |
| 21 | 83 | 18 | 20 |
| 22 | - | - | - |
| 23 | 27 | 74 | 20 |
| 24 | 42 | 59 | 20 |
| 25 | 61 | 40 | 20 |
| 26 | 20 | 81 | 20 |

Fig.25

| Results of scheduling (categorized such that the numbers of candidates become equal) | | | | |
|---|---|---|---|---|
| Candidate No. | Execution time of core 0 ($\mu$s) | Execution time of core 1 ($\mu$s) | Offset ($\mu$s) | Group |
| 11 | 101 | 0 | – | – |
| 14 | 94 | 7 | 20 | A |
| 15 | 90 | 11 | 20 | A |
| 21 | 83 | 18 | 20 | A |
| 13 | 79 | 22 | 20 | B |
| 19 | 72 | 29 | 20 | B |
| 25 | 61 | 40 | 20 | B |
| 12 | 60 | 41 | 20 | C |
| 18 | 49 | 52 | 20 | C |
| 24 | 42 | 59 | 20 | C |
| 16 | 38 | 63 | 20 | D |
| 23 | 27 | 74 | 20 | D |
| 26 | 20 | 81 | 20 | D |

Fig.26

| Candidate No. | Execution time of core 0 (μs) | Execution time of core 1 (μs) | Offset (μs) | Group |
|---|---|---|---|---|
| 11 | 101 | 0 | – | – |
| 14 | 94 | 7 | 20 | A |
| 15 | 90 | 11 | 20 | A |
| 21 | 83 | 18 | 20 | A |
| 13 | 79 | 22 | 20 | A |
| 19 | 72 | 29 | 20 | B |
| 25 | 61 | 40 | 20 | B |
| 12 | 60 | 41 | 20 | B |
| 18 | 49 | 52 | 20 | C |
| 24 | 42 | 59 | 20 | C |
| 16 | 38 | 63 | 20 | D |
| 23 | 27 | 74 | 20 | D |
| 26 | 20 | 81 | 20 | D |

Results of scheduling (categorized based on range of execution times)

Fig.27

| Candidate No. | Results of scheduling (exemplary divisions at positions where differences become large) | | | | |
|---|---|---|---|---|---|
| | Execution time of core 0 ($\mu$s) | Execution time of core 1 ($\mu$s) | Offset ($\mu$s) | Difference ($\mu$s) | Group |
| 11 | 101 | 0 | – | – | – |
| 14 | 94 | 7 | 20 | – | A |
| 15 | 90 | 11 | 20 | 4 | A |
| 21 | 83 | 18 | 20 | 7 | A |
| 13 | 79 | 22 | 20 | 4 | A |
| 19 | 72 | 29 | 20 | 7 | A |
| 25 | 61 | 40 | 20 | 11 | B |
| 12 | 60 | 41 | 20 | 1 | B |
| 18 | 49 | 52 | 20 | 11 | C |
| 24 | 42 | 59 | 20 | 7 | C |
| 16 | 38 | 63 | 20 | 4 | C |
| 23 | 27 | 74 | 20 | 11 | D |
| 26 | 20 | 81 | 20 | 7 | D |

Fig.31

| Results of scheduling | | | |
|---|---|---|---|
| Candidate No. | Execution time of core 0 ($\mu$s) | Execution time of core 1 ($\mu$s) | Offset ($\mu$s) |
| 41 | 101 | 0 | - |
| 42 | 60 | 41 | 20 |
| 43 | 79 | 22 | 20 |
| 44 | 94 | 7 | 83 |
| 45 | 90 | 11 | 83 |
| 46 | - | - | - |
| 47 | 53 | 48 | 20 |
| 48 | 49 | 52 | 20 |
| 49 | 72 | 29 | 20 |
| 50 | 68 | 33 | 20 |
| 51 | 83 | 18 | 83 |
| 52 | - | - | - |
| 53 | - | - | - |
| 54 | 42 | 59 | 20 |
| 55 | 61 | 40 | 20 |
| 56 | 20 | 81 | 20 |

Fig.32

| Results of scheduling (categorized based on offsets and ranges of execution times) | | | | |
|---|---|---|---|---|
| Candidate No. | Execution time of core 0 ($\mu$s) | Execution time of core 1 ($\mu$s) | Offset ($\mu$s) | Group |
| 41 | 101 | 0 | – | – |
| 43 | 79 | 22 | 20 | A |
| 49 | 72 | 29 | 20 | A |
| 50 | 68 | 33 | 20 | A |
| 55 | 61 | 40 | 20 | A |
| 42 | 60 | 41 | 20 | A |
| 47 | 53 | 48 | 20 | A |
| 48 | 49 | 52 | 20 | B |
| 54 | 42 | 59 | 20 | B |
| 56 | 20 | 81 | 20 | B |
| 44 | 94 | 7 | 83 | C |
| 45 | 90 | 11 | 83 | C |
| 51 | 83 | 18 | 83 | C |

Fig.33

| Results of scheduling (categorized based on offsets and ranges of execution times) | | | | |
|---|---|---|---|---|
| Candidate No. | Execution time of core 0 ($\mu$s) | Execution time of core 1 ($\mu$s) | Offset ($\mu$s) | Group |
| 41 | 101 | 0 | − | − |
| 43 | 79 | 22 | 20 | A |
| 49 | 72 | 29 | 20 | A |
| 50 | 68 | 33 | 20 | A |
| 55 | 61 | 40 | 20 | A |
| 42 | 60 | 41 | 20 | A |
| 47 | 53 | 48 | 20 | B |
| 48 | 49 | 52 | 20 | B |
| 54 | 42 | 59 | 20 | B |
| 56 | 20 | 81 | 20 | C |
| 44 | 94 | 7 | 83 | D |
| 45 | 90 | 11 | 83 | D |
| 51 | 83 | 18 | 83 | D | ns to the present invention includes depen-
SCHEDULE DECISION DEVICE, PARALLEL EXECUTION DEVICE, SCHEDULE DECISION METHOD, AND PROGRAM The present application is the National Phase of PCT/JP2009/064541, filed Aug. 20, 2009, which claims priority based on Japanese Patent Application JP 2008-292119 filed on Nov. 14, 2008, the entire content of which is incorporated herein by reference in its entirety.

TECHNICAL FIELD

The present invention relates to techniques that perform scheduling for which a plurality of tasks are executed in parallel.

BACKGROUND ART

In recent years, the demand for digital devices having high performance and low power consumption has strongly increased. As a way to address this demand, these demands, a multi-core structuring method in which a plurality of processors are mounted on an embedded LSI (Large Scale Integration) has been gaining attention.

To effectively use such a multi-core structured device, although parallel programming needs to execute an application in parallel, generally, there are more considerable and difficult factors in parallel programming than in ordinary single-core structured programming.

To make parallel programming easy, in a multi-processor system presented in Patent Literature 1, a compiler extracts parallelizable sub tasks from an input program and assigns the sub tasks to individual processor units based on their characteristics so as to effectively perform scheduling.

Moreover, in a real time system, an application that is executed in parallel needs to be scheduled such that a situation in which a task is not completed until its execution period elapses does not occur (no deadline mistake occurs).

To prevent this deadline mistake from occurring, a scheduling determination method described in Patent Literature 2 uses a predetermined determination formula to determine whether or not a multi-core based schedule can be executed without the occurrence of a deadline mistake.

RELATED ART LITERATURES

Patent Literatures

Patent Literature 1: JP 4082706
Patent Literature 2: JP 4016010

SUMMARY OF THE INVENTION

Problem to be Solved by the Invention

However, there was a problem in which the parallel execution scheme obtained as an optimum in the scheduling presented in Patent Literature 1 did not always have optimum scheduling in a system where a plurality of tasks were independently started at different periods.

If the execution periods of individual tasks are different, since they use a processor (core) when necessary, the influence of one task may cause the execution of another task to wait.

In particular, when scheduling for which tasks are executed in parallel using a plurality of cores is performed, if one core is executing another task, the core causes tasks that are to be executed in parallel (parallel execution tasks) to wait, and this causes a situation in which the entire device cannot carry out the parallel execution at all.

Thus, taking into account the influence of all tasks, even an automatically parallelizing compiler presented in Patent Literature 1 may not be able to optimize a schedule.

In the method presented in Patent Literature 2, there was a problem in which, although it can be decided whether or not a deadline mistake has occurred in a generated schedule, namely, the schedule can help to determine whether or not tasks were able to be executed in parallel by a plurality of cores, it cannot be determined which was the optimum schedule for executing the tasks.

The present invention aims at providing techniques that optimize a schedule for which a plurality of tasks are executed in parallel by multi-cores.

Means that Solve the Problem

To accomplish the foregoing object, a schedule decision device according to the present invention includes dependency acquisition means that acquires dependencies of execution sequences required for a plurality of sub tasks into which a first task has been divided; candidate generation means that generates a plurality of sub task structure candidates that satisfy said dependencies acquired by said dependency acquisition means and for which a plurality of processing devices execute said plurality of sub tasks; scheduling means that generates a plurality of schedule candidates by further assigning at least one second task to each of said sub task structure candidates generated by said candidate generation means; effective degree computation means that computes an effective degree that represents effectiveness of executions of said first task and said second task for each of said plurality of schedule candidates generated by said scheduling means; and candidate decision means that decides a schedule candidate used for the executions of said first task and said second task from said plurality of schedule candidates based on said effective degrees computed by said effective degree computation means.

A parallel execution device according to the present invention includes dependency acquisition means that acquires dependencies of execution sequences required for a plurality of sub tasks into which a first task has been divided; candidate generation means that generates a plurality of sub task structure candidates that satisfy said dependencies acquired by said dependency acquisition means and for which a plurality of processing devices execute said plurality of sub tasks; scheduling means that generates a plurality of schedule candidates by further assigning at least one second task to each of said sub task structure candidates generated by said candidate generation means; effective degree computation means that computes an effective degree that represents effectiveness of executions of said first task and said second task for each of said plurality of schedule candidates generated by said scheduling means; candidate decision means that decides a schedule candidate used for the executions of said first task and said second task from said plurality of schedule candidates based on said effective degrees computed by said effective degree computation means; and parallel execution means that executes said first task and said second task by using said schedule candidates decided by said candidate decision means.

A schedule decision method according to the present invention includes acquiring dependencies of execution sequences required for a plurality of sub tasks into which a first task has been divided; generating a plurality of sub task structure candidates that satisfy said dependencies and for which a plurality of processing devices execute said plurality of sub tasks; generating a plurality of schedule candidates by further assigning at least one second task to each of said sub task structure candidates; computing an effective degree that represents effectiveness of executions of said first task and said second task for each of said plurality of schedule candidates; and deciding a schedule candidate used for the executions of said first task and said second task from said plurality of schedule candidates based on said effective degrees.

A program according to a first aspect of the present invention is a program that causes a computer to execute the procedures including a dependency acquisition procedure that acquires dependencies of execution sequences required for a plurality of sub tasks into which a first task has been divided; a candidate generation procedure that generates a plurality of sub task structure candidates that satisfy said dependencies acquired by said dependency acquisition procedure and for which a plurality of processing devices execute said plurality of sub tasks; a scheduling procedure that generates a plurality of schedule candidates by further assigning at least one second task to each of said sub task structure candidates generated by said candidate generation procedure; an effective degree computation procedure that computes an effective degree that represents the effectiveness of executions of said first task and said second task for each of said plurality of schedule candidates generated by said scheduling procedure; and a candidate decision procedure that decides a schedule candidate used for the execution of said first task and said second task from among said plurality of schedule candidates based on said effective degrees computed by said effective degree computation procedure.

A program according to a second aspect of the present invention is a program that causes a computer to execute the procedures including a dependency acquisition procedure that acquires dependencies of execution sequences required for a plurality of sub tasks into which a first task has been divided; a candidate generation procedure that generates a plurality of sub task structure candidates that satisfy said dependencies acquired by said dependency acquisition procedure and for which a plurality of processing devices execute said plurality of sub tasks; a scheduling procedure that generates a plurality of schedule candidates by further assigning at least one second task to each of said sub task structure candidates generated by said candidate generation procedure; an effective degree computation procedure that computes an effective degree that represents the effectiveness of executions of said first task and said second task for each of said plurality of schedule candidates generated by said scheduling procedure; a candidate decision procedure that decides a schedule candidate used for the executions of said first task and said second task from said among plurality of schedule candidates based on said effective degrees computed by said effective degree computation procedure; and a parallel execution procedure that executes said first task and said second task by using said schedule candidates decided by said candidate decision procedure.

Effect of the Invention

According to the present invention, a schedule decision device assigns sub tasks into which a first task has been divided to a plurality of cores so as to satisfy dependencies, generates a plurality of sub task structure candidates, generates schedule candidates in which a second task is assigned for each candidate, and decides a schedule based on the effective degree of each scheduling candidate. Since the schedule decision device assigns the sub tasks and then assigns the second task therebetween, the likelihood in which the second task causes the first task that is executed in parallel to wait and in which the entire schedule becomes unexecutable decreases. In addition, since the schedule decision device computes the effective degree of each scheduling candidate, a schedule can be optimized by obtaining an optimum scheduling candidate based on the effective degree.

BRIEF DESCRIPTION OF DRAWINGS

[FIG. 5]($a$) is a schematic diagram showing a shape of a task structure candidate according to the first embodiment of the present invention. ($b$) is a schematic diagram showing a shape of a task structure candidate according to the first embodiment of the present invention. ($c$) is a schematic diagram showing a shape of a task structure candidate according to the first embodiment of the present invention.

[FIG. 6]($a$) is a schematic diagram showing a shape of a represented task structure candidate according to the first embodiment of the present invention. ($b$) is a schematic diagram showing a shape of a represented task structure candidate according to the first embodiment of the present invention. ($c$) is a schematic diagram showing a shape of a represented task structure candidate according to the first embodiment of the present invention.

[FIG. 7] is a table showing execution times and offsets of task structure candidates according to the first embodiment of the present invention.

[FIG. 19] is a schematic diagram showing results of scheduling according to the second embodiment of the present invention.

[FIG. 25] is a table showing results of categorization of candidates according to the third embodiment of the present invention.

[FIG. 26] is a table showing results of categorization of candidates according to the third embodiment of the present invention.

[FIG. 27] is a table showing results of categorization of candidates according to the third embodiment of the present invention.

[FIG. 31] is a schematic diagram showing results of scheduling according to the third embodiment of the present invention.

[FIG. 32] is a table showing results of categorization of candidates according to the third embodiment of the present invention.

[FIG. 33] is a table showing results of categorization of candidates according to the third embodiment of the present invention.

MODES THAT CARRY OUT THE INVENTION (First Embodiment)

With reference to drawings, a first embodiment that embodies the present invention will be described in detail.

Figure 1:
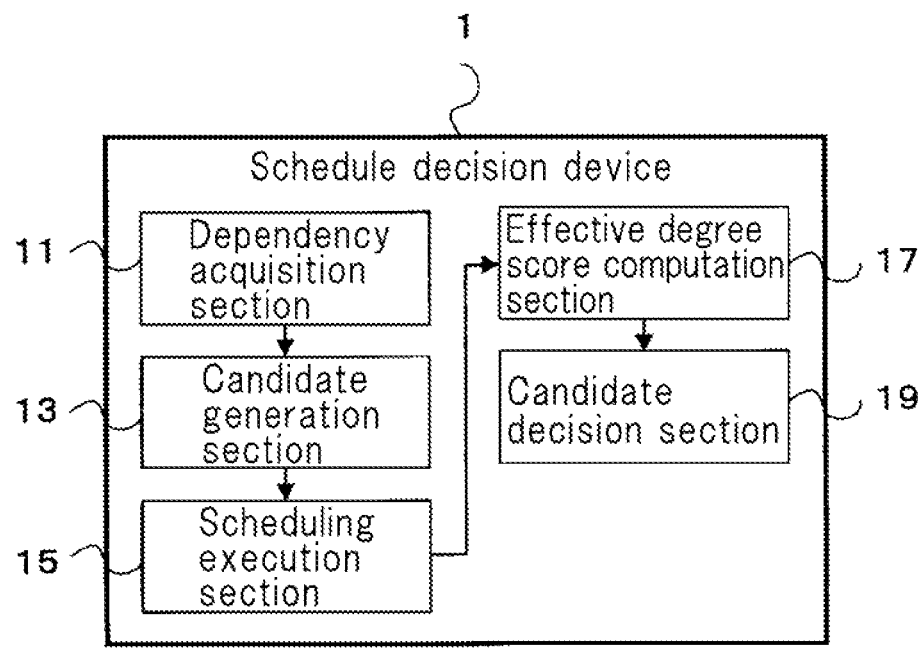
[FIG. 1] is a block diagram showing a structure of a schedule decision device according to a first embodiment of the present invention.

FIG. 1 is a block diagram showing a structure of schedule decision device 1 according to this embodiment. Schedule decision device 1 is a device that obtains an optimum schedule for which a plurality of tasks having different periods are executed in parallel by multi-cores. Referring to the drawing, schedule decision device 1 has dependency acquisition section 11, candidate generation section 13, scheduling execution section 15, effective degree score computation section 17, and candidate decision section 19.

Dependency acquisition section 11 divides a task (first task) having a predetermined execution period (first period) into a plurality of sub tasks and obtains the dependencies of the execution sequences among these sub tasks. Alternatively, dependency acquisition section 11 may input what a task having a first period has been divided into sub tasks and obtains the dependencies of the execution sequences among these sub tasks.

Candidate generation section 13 generates a plurality of candidates of a schedule (scheduling candidates) for which sub tasks are executed in parallel by a plurality of cores such that the dependencies are satisfied.

Scheduling execution section 15 virtually executes the divided task (first task) and another task that is different from the divided task (second task) between sub tasks for each of the candidates.

Effective degree score computation section 17 computes an effective degree score that represents effectiveness as a task execution schedule for each candidate based on the executed results. The computation method for effective degree scores will be described later.

Candidate decision section 19 decides a candidate having the highest effective degree score as the optimum candidate.

Figure 2:
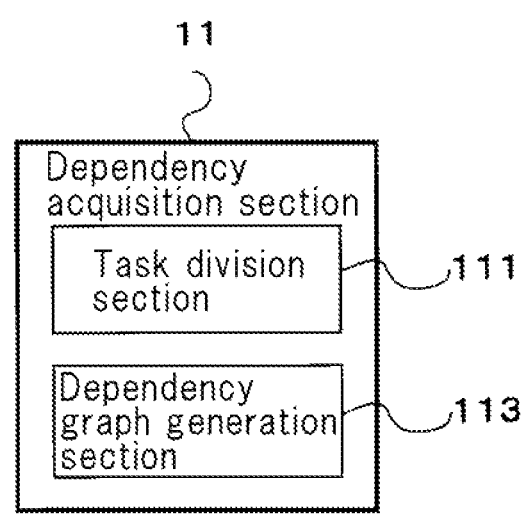
[FIG. 2] is a block diagram showing a structure of a dependency acquisition section according to the first embodiment of the present invention.

FIG. 2 is a block diagram showing a structure of dependency acquisition section 11. Referring to the drawing, dependency acquisition section 11 has task division section 111 and dependency graph generation section 113.

Figure 3:
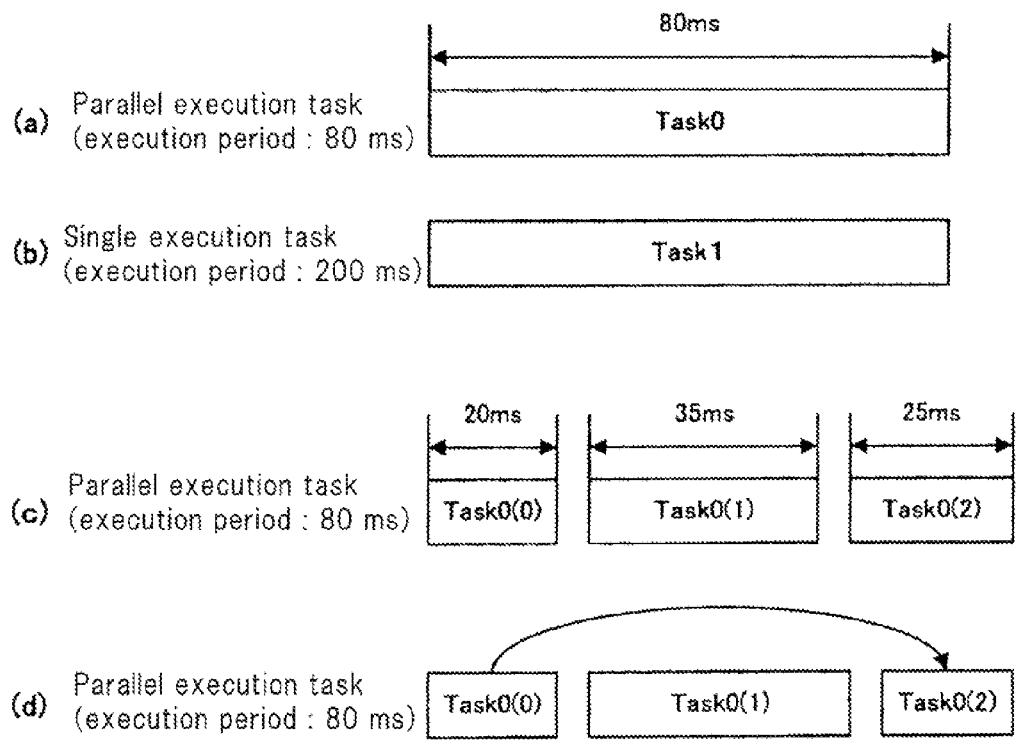
[FIG. 3]($a$) is a schematic diagram showing a shape of a parallel execution task according to the first embodiment of the present invention. ($b$) is a schematic diagram showing a shape of a single execution task according to the first embodiment of the present invention. ($c$) is a schematic diagram showing shapes of sub tasks according to the first embodiment of the present invention. ($d$) is a schematic diagram showing dependencies among sub tasks according to the first embodiment of the present invention.

FIGS. 3 (a), (b), (c), and (d) are schematic diagrams serving to describe divisions and dependencies of tasks. Schedule decision device 1 performs scheduling for a plurality of different tasks. For example, in this embodiment, Task 0 that is executed at a period of 80 ms shown in FIG. 3 (a) and Task 1 that is executed at a period of 200 ms shown in FIG. 3 (b) are scheduled. The lengths of bars shown in (a) and (b) of the drawing represent maximum execution times of the individual tasks, for example, the maximum execution times of Task 0 and Task 1 are both 80 ms.

Task division section 111 searches for times at which a task that can be executed in parallel by a plurality of cores (hereinafter this task is referred to as "parallel execution task") of tasks to be scheduled can be divided (division points). With respect to the decision of division points, although task division section 111 does not generally divide a task if sub tasks thereof cannot be executed in parallel, task division section 111 divides a task if dependencies of its sub tasks are weak, for example, the amount of data that are exchanged among sub tasks is small. However, since a task is optimized using time information such as maximum execution times of divided task (hereinafter referred to as "sub tasks"), a program that structures the task does not need to be divided.

Here, the maximum execution times of individual tasks (sub tasks) can be obtained using a method presented on p. 113 to 115 of Patent Literature 1.

Then, task division section 111 divides the parallel execution task into a plurality of sub tasks at the division points. Task division section 111 does not divide a task executed by one core (hereinafter referred to as "single execution task"). For example, in this embodiment, Task 0 is a parallel execution task, whereas Task 1 is a single execution task. Thus, task division section 111 divides only Task 0 into sub tasks.

FIG. 3 (c) is a schematic diagram showing a parallel execution task divided by task division section 111. For example, Task 0 is divided into Task 0[0] having a maximum execution time of 20 ms, Task 0[1] having a maximum execution time of 35 ms, and Task 0[2] having a maximum execution time of 25 ms.

Dependency graph generation section 113 obtains the dependencies of execution sequences among sub tasks. FIG. 3 (d) shows the dependencies obtained by dependency graph generation section 113 (dependency graph). Generally, if a single task is divided into a plurality of sub tasks, dependencies with respect to execution sequences may occur among these sub tasks. For example, since Task 0[2] refers to results computed by Task 0[0], the device needs to execute Task 0[0] prior to Task 0[2].

Figure 4:
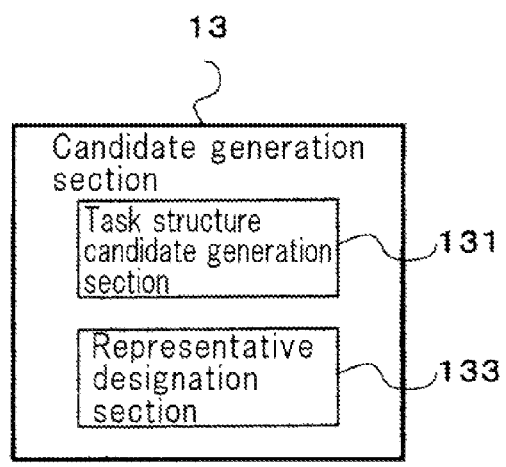
[FIG. 4] is a block diagram showing a structure of a candidate generation section according to the first embodiment of the present invention.

FIG. 4 is a block diagram showing a structure of candidate generation section 13. Referring to the drawing, candidate generation section 13 has task structure candidate generation section 131 and representative designation section 133. Task candidate generation section 131 generates candidate schedules for which all sub tasks are executed by a plurality of cores so as to satisfy the dependencies (hereinafter these candidates are referred to as "task structure candidates").

For example, in this embodiment, task structure candidate generation section 131 generates a schedule for which Task 0[0], Task 0[1], and Task 0[2] are executed by two cores, core 0 and core 1, such that Task 0[0] is executed prior to Task 0[2] (task structure candidate).

FIGS. 5 (a), (b), and (c) show exemplarily generated task structure candidates. Task structure candidate a1 shown in (a) of the drawing is a schedule for which sub tasks are executed in the sequence of Task 0[1] and Task 0[2] by core 0 and Task 0[0] is executed by core 1. Task structure candidates a2 shown in (b) of the drawing is a schedule for which sub tasks are executed in the sequence of Task 0[0] and Task 0[1] by core 0 and after Task 0[0] is executed, Task 0[2] is executed by core 1. Task structure candidates a3 shown in (c) of the drawing is a schedule for which sub tasks are executed in the sequence of Task 0[0] and Task 0[2] and Task 0[1] is executed by core 1.

As shown in FIGS. 6 (a), (b), and (c), representative designation section 133 causes individual task structure candidates to be represented. (a), (b), and (c) of the drawing are schematic diagrams that show the structures of the represented candidates. The representation hides the structures of sub tasks that become unnecessary after the process for task structure candidates.

Specifically, as shown in FIG. 7 representative designation section 133 generates a table that presents "execution time" (representative value) of each core and offset (representative value) for each task structure candidate. "Execution time" is the maximum value of time necessary for processing a sub task by each core (maximum execution time). The offset is the time after the execution of a sub task is started by one core until the execution of a sub task is started by another core.

For example, in task structure candidate a1, sub tasks are executed in the sequence of Task 0[1] and Task 0[2] by core 0 and when Task 0[1] is started by core 0, Task 0[0] is started simultaneously. Since the maximum execution times of Task 0[0], Task 0[1], and Task 0[2] are 20 ms, 35 ms, and 25 ms, respectively, "execution time" of core 0 becomes 60 ms, "execution time" of core 1 becomes 20 ms, and the offset becomes 0 ms.

In task structure candidate a2, sub tasks are executed in the sequence of Task 0[0] and Task 0[1] by core 0, and 30 ms after Task 0[0] is started by core 0, Task 0[2] is started. In this case, the maximum execution time of core 0 becomes 55 ms, "execution time" of core 1 becomes 25 ms, and the offset becomes 30 ms. On the other hand, in task structure candidate a3, "execution time" of core 0 becomes 45 ms, "execution time" of core 1 becomes 35 ms, and the offset becomes 0 ms.

Scheduling execution section 15 virtually executes sub tasks and a single execution task for each task structure candidate, for example, on an automatic optimization system and designates their scheduling results as schedule candidates. Scheduling execution section 15 executes a schedule for tasks having different execution periods for a time of the least common multiple of their execution periods. Even if scheduling longer than the time of the least common multiple is performed, since the schedule is repeated in the duration of the least common multiple or less, it is wasteful. In contrast, when scheduling is virtually performed only for the time of the least common multiple, schedule decision device 1 can cover all influences of scheduling that can occur.

For example, in this embodiment, since the execution period of Task 0 is 80 ms and the execution period of Task 1 is 200 ms, a schedule for at least 400 ms that is their least common multiple is generated.

Figure 8:
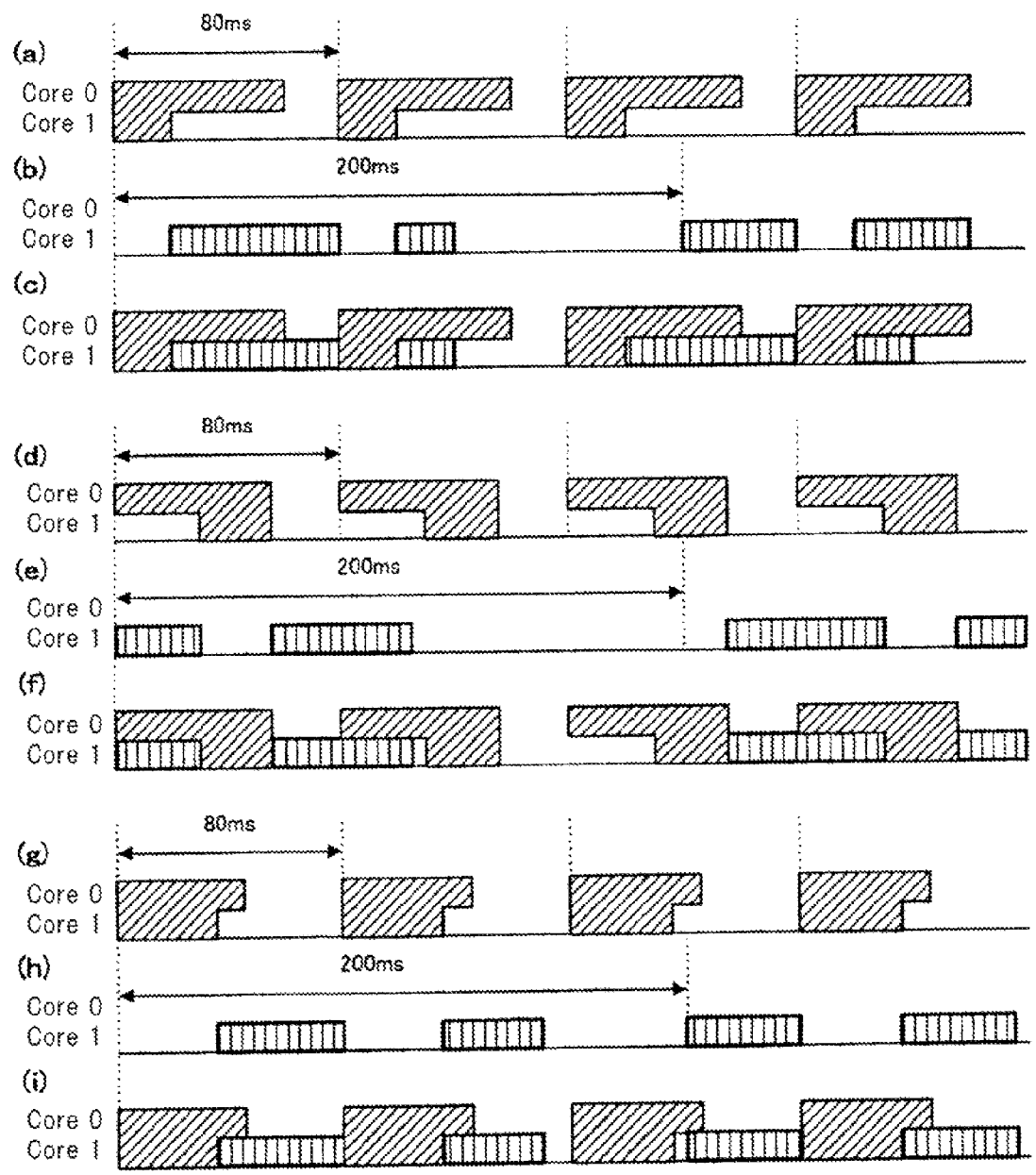
[FIG. 8]($a$) is a schematic diagram showing results of scheduling according to the first embodiment of the present invention. ($b$) is a schematic diagram showing results of scheduling according to the first embodiment of the present invention. ($c$) is a schematic diagram showing results of scheduling according to the first embodiment of the present invention. ($d$) is a schematic diagram showing results of scheduling according to the first embodiment of the present invention. ($e$) is a schematic diagram showing results of scheduling according to the first embodiment of the present invention. ($f$) is a schematic diagram showing results of scheduling according to the first embodiment of the present invention. ($g$) is a schematic diagram showing results of scheduling according to the first embodiment of the present invention. ($h$) is a schematic diagram showing results of scheduling according to the first embodiment of the present invention. ($i$) is a schematic diagram showing results of scheduling according to the first embodiment of the present invention.

FIG. 8 (a) to (j) are schematic diagrams showing results of scheduling that are virtually executed. In these drawings, the lengths of bars that extend in the horizontal axis direction represent execution times of tasks (sub tasks).

FIG. 8 (a) is a schematic diagram showing an execution schedule for sub tasks in task structure candidate a1. The execution time of core 0 is 60 ms (hatched portion), the execution time of core 1 is 20 ms (hatched portion), the offset is 0 ms, and the schedule is executed at intervals of 80 ms.

FIG. 8 (b) is a schematic diagram showing an execution schedule for a single execution task (Task 1) while task structure candidate a1 is being executed. As shown in (b) of the drawing, while core 1 is idle between sub tasks, the single execution task is executed by the core.

FIG. 8 (c) is a schematic diagram showing results of scheduling for sub tasks and a single execution task in task structure candidate a1.

FIG. 8 (d) is a schematic diagram showing an execution schedule for sub tasks in task structure candidate a2. FIG. 8 (e) of the drawing is a schematic diagram showing an execution schedule for a single execution task (Task 1) while task structure candidate a2 is being executed. FIG. 8 (f) of the drawing is a schematic diagram showing results of scheduling for sub tasks and a single execution task in task structure candidate a2.

FIG. 8 (g) is a schematic diagram showing an execution schedule for sub tasks in task structure candidate a3. FIG. 8 (h) of the drawing is a schematic diagram showing an execution schedule for a single execution task (Task 1) while task structure candidate a3 is being executed. FIG. 8 (i) of the drawing is a schematic diagram showing results of scheduling for sub tasks and a single execution task in task structure candidate a3.

Effective degree score computation section 17 computes effective degree scores of individual scheduling candidates. Effective degree scores are values that represent conformity degrees of schedules (scheduling candidates) with system requirements to be developed and can be computed, for example, by the following formula (1).

(Effective degree score of task structure candidate)
$= k1 \times$(effective degree score of Task 0)$+ k2 \times$(effective degree score of Task 1)     (1)

In the foregoing formula (1), k1 and k2 are weighting coefficients. The effective degree score of each task in the formula (1) can be computed by the following formula (2).

(Effective degree score of each task)$= k3 \times$(average tolerance degree)$+ k4 \times$(average interruption time)/(execution period)$+ k5 \times$(average jitter)/(execution period)     (2)

In the foregoing formula (2), k3, k4, and k5 are weighting coefficients. "Average tolerance degree" is an average value of tolerance degrees computed for each execution period by the following formula (3). "Average interruption time" is an average value of times for which a task is interrupted in each execution period. "Average jitter" is an average value of delay times after a period starts until a task start in each execution period.

(Tolerance degree)$= \{$(execution period)$-$(task completion time)$\}$/(execution period)     (3)

In the foregoing formula (3), "task completion time" is a time after a period starts until the entire process of a task is completed. With respect to a parallel execution task (Task 0), it is a time until all sub tasks are completed.

Figures 9, 10:
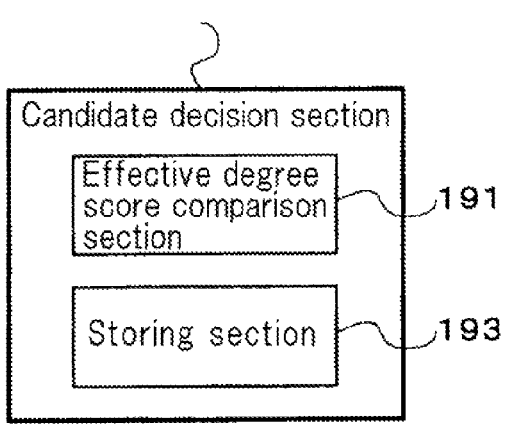
[FIG. 9] is a table showing results of computations of effective degree scores according to the first embodiment of the present invention.
[FIG. 10] is a block diagram showing a structure of a candidate decision section according to the first embodiment of the present invention.

FIG. 9 shows an average tolerance degree, an average interruption time, an average jitter, and an effective degree score computed for each task structure candidate. Effective degree scores are values in the condition in which all the weighting coefficients (k1 to k5) are 1. Referring to the drawing, "0.75," "0.92," and "1.05" have been computed as effective degree scores of task structure candidates a1, a2, and a3, respectively.

FIG. 10 is a block diagram showing a structure of candidate decision section 19. Referring to the drawing, candidate decision section 19 has effective degree score comparison section 191 and storing section 193. Effective degree score comparison section 191 compares effective degree scores of individual task structure candidates. Storing section 193 stores a task structure candidate having the highest effective degree score. Schedule decision device 1 outputs a task structure candidate that is stored in storing section 193 as the optimum candidate.

Figure 11:
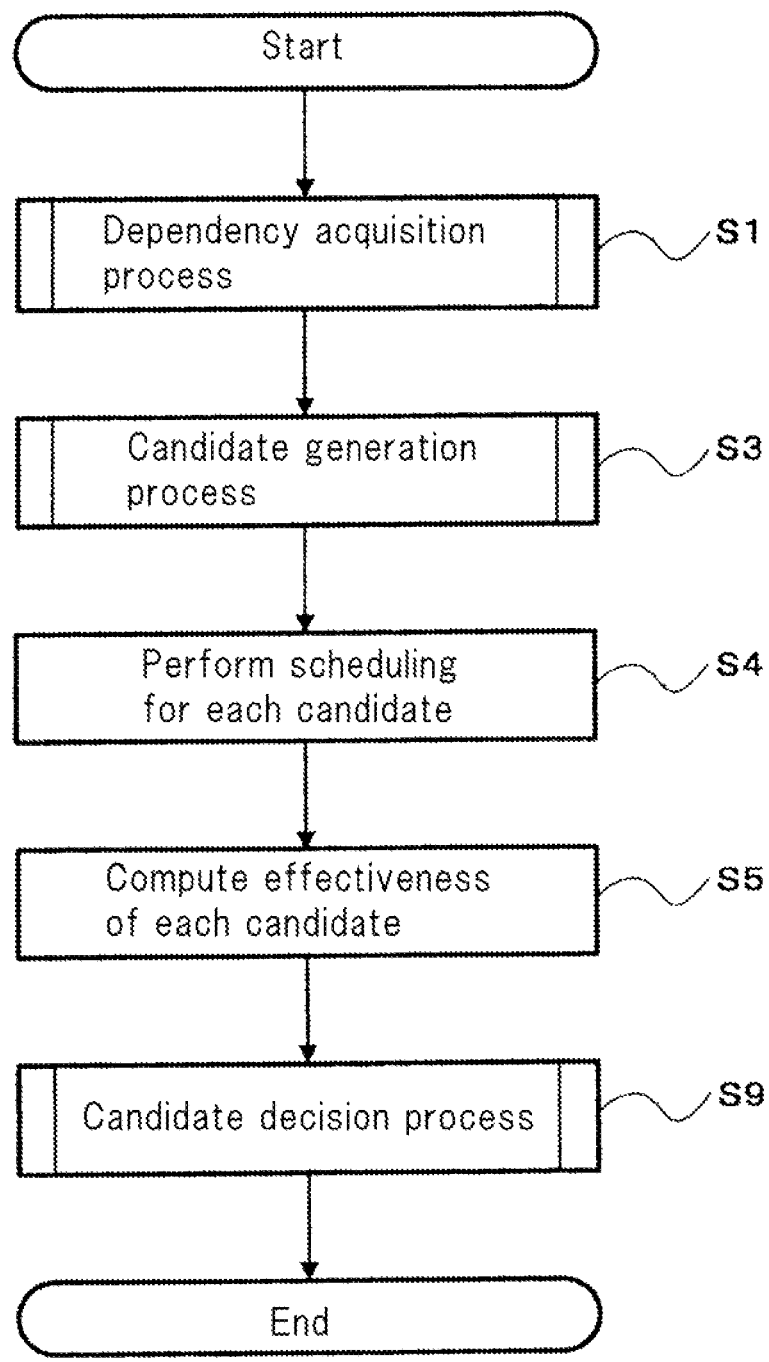
[FIG. 11] is a flow chart showing an operation of a schedule decision device according to the first embodiment of the present invention.

Next, with reference to FIG. 11 to FIG. 15, operation of the schedule decision device will be described. FIG. 11 is a flow chart showing the operation of schedule decision device 1. Referring to the drawing, dependency acquisition section 11 executes a dependency acquisition process (at step S1) and candidate generation section 13 executes a candidate generation process (at step S3). Then, scheduling execution section 15 executes scheduling for each represented task structure candidate (at step S4). Effective degree score computation section 17 computes an effective degree score for each schedule candidate (at step S5). Candidate decision section 19 executes a candidate decision process (at step S9). After step S9, schedule decision device 1 completes the operation.

Figure 12:
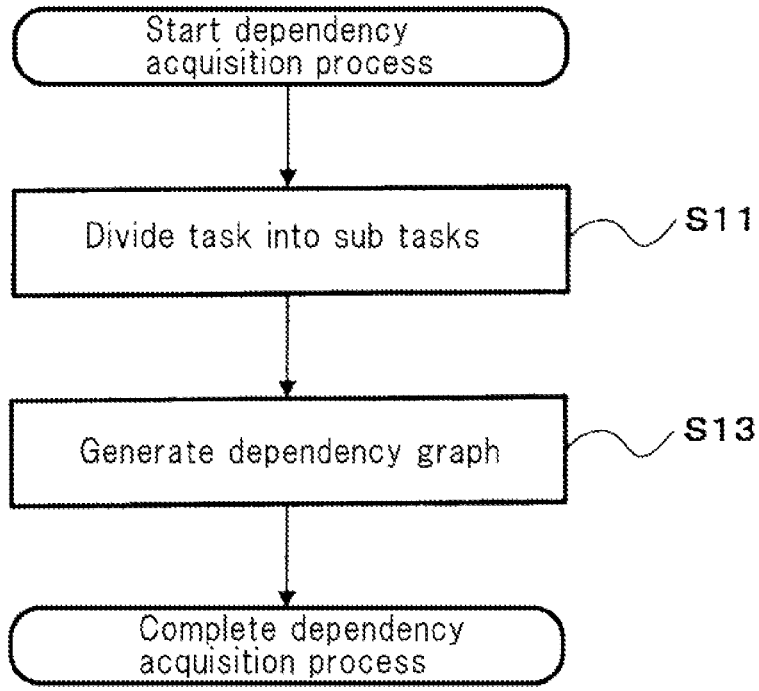
[FIG. 12] is a flow chart showing a dependency generation process according to the first embodiment of the present invention.

FIG. 12 is a flow chart showing the dependency acquisition process. Referring to the drawing, dependency acquisition section 11 divides a parallel execution task into a plurality of sub tasks (at step S11) and generates a dependency graph so as to obtain the dependencies among the sub tasks (at step S13). After step S13, dependency acquisition section 11 completes the dependency acquisition process.

Figure 13:
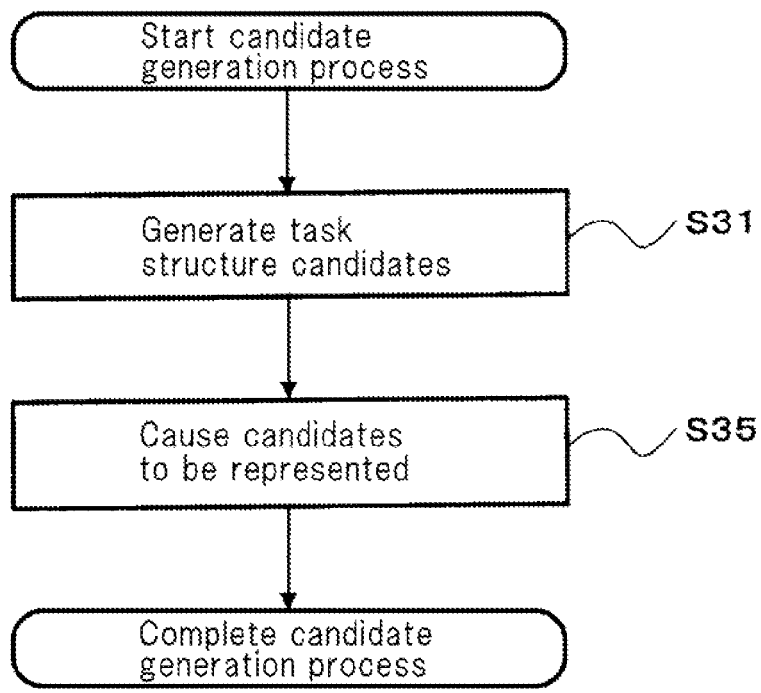
[FIG. 13] is a flow chart showing a candidate generation process according to the first embodiment of the present invention.

FIG. 13 is a flow chart showing the candidate generation process. Referring to the drawing, candidate generation section 13 generates task structure candidates so as to satisfy the dependencies (at step S31) and causes the generated task structure candidates to be represented (at step S35). After step S35, candidate generation section 13 completes the candidate generation process.

Figure 14:
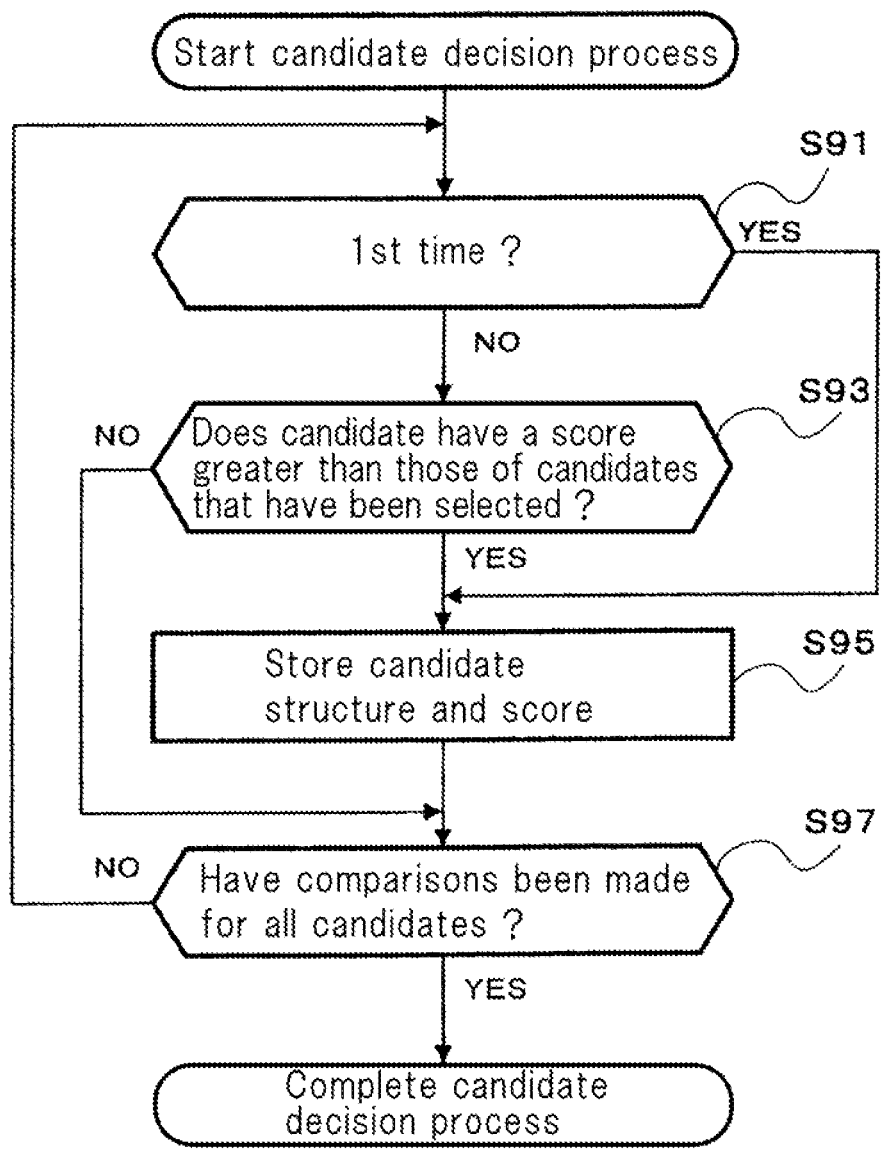
[FIG. 14] is a flow chart showing a candidate decision process according to the first embodiment of the present invention.

FIG. 14 is a flow chart showing the candidate decision process. Referring to the drawing, candidate decision section 19 selects any task structure candidate and determines whether or not it is a candidate that has been selected the first time (at step S91).

If the selected task structure candidate is not a candidate that has been selected the first time (at step S91:NO), candidate decision section 19 determines whether or not the selected candidate is a candidate from which an effective degree score, that is greater than those of the candidates that had been selected so far has, been computed (at step S93).

If the selected candidate is a candidate from which an effective degree score, that is greater than those of candidates that had been selected so far, has been computed (at step S93:YES) or if the selected candidate is a candidate that has been selected the first time (at step S91:YES), candidate decision section 19 stores the schedule structure of the task structure candidate and the computed effective degree score (at step S95).

If the selected candidate is not a candidate from which an effective degree score, that is greater than those of candidates that had been selected so far, has been computed (at step S93:NO) or after step S95, candidate decision section 19 selects all the candidates and determines whether or not all the effective degree scores have been compared (at step S97). If comparisons have not been made for all the candidates (at step S97:NO), candidate decision section 19 returns control to step S91. If the comparisons have been made for all the candidates (at step S97:Yes), candidate decision section 19 completes the candidate decision process.

In this embodiment, although schedule decision device 1 targets one parallel execution task (Task 0) and one single execution task (Task 1) for scheduling, schedule decision device 1 can perform scheduling for only a plurality of parallel execution tasks rather than for a single execution task. Alternatively, schedule decision device 1 can target a plurality of parallel execution tasks and one or more single execution tasks for scheduling as well as one parallel execution task and a plurality of single execution tasks for scheduling.

In this embodiment, although schedule decision device 1 performs scheduling for tasks having different execution periods, schedule decision device 1 may perform scheduling for a plurality of tasks having the same execution period.

If scheduling candidates are obtained for a plurality of parallel execution tasks, even if the shapes of sub tasks of a task are the same, when the shapes of sub tasks of another task are different, they are treated as different candidates. For example, if the shapes of sub tasks of one task are A and B and the shapes of sub tasks of another task are a and b, schedule decision device 1 treats a combination of A and a and a combination of A and b as different candidates.

Moreover, in this embodiment, although schedule decision device 1 generates a schedule for which a task is executed in parallel by two cores, of course schedule decision device 1 can generate a schedule for which a task is executed in parallel by three or more cores.

In this embodiment, although the schedule decision device itself divides a parallel execution task, another device may divide a task and schedule decision device 1 may obtain divided sub tasks from the other device.

In this embodiment, as shown in FIG. 7, although schedule decision device 1 generates a table that presents results of scheduling, they may be output in any format other than a table as long as information that represents an execution duration of each sub task by each core for each task structure candidate is contained.

In this embodiment, although the execution time and offset of each core are presented on the table, the execution start time (representative value) and execution end time (representative value) of each sub task of each core may be presented.

In this embodiment, although schedule decision device 1 computes effective degree scores using the foregoing formula (1), formula (2), and formula (3), other formulas may be used as long as effective degree scores can be computed based on at least one value from among tolerance degree, interruption time, and jitter.

In this embodiment, schedule decision device 1 decides a candidate having the maximum effective degree score as the optimum candidate, and schedule decision device 1 may decide this by using another method, for example, a candidate having an effective degree score that is equal to or greater than a predetermined threshold as the optimum candidate.

As described above, according to this embodiment, schedule decision device 1 assigns sub tasks divided from a parallel execution task (first task) to a plurality of cores (processing devices) such that their dependencies are satisfied, generates a plurality of task structure candidates (sub task structure candidates), generates scheduling candidates for which a single execution task (second task) is assigned for each candidate, and decides a schedule based on the effective degree of each scheduling candidate. After sub tasks are assigned, since the second task is assigned therebetween, the likelihood in which the second task causes the first task that is executed in parallel to wait and in which the entire schedule becomes unexecutable decreases. In addition, since the schedule decision device computes the effective degree of each scheduling candidate, a schedule can be optimized by obtaining the optimum scheduling candidate based on the effective degree.

Since candidate generation section 13 generates a table that presents durations for which sub tasks are executed for each core (processing device) as the foregoing candidate, when the generated schedule is output, the schedule structure can be visualized, for example, by forming it in a two-dimensional shape.

Since scheduling execution section 15 performs scheduling for a duration of the least common multiple of execution periods (first period and second period) of individual tasks, all influences of the scheduling that may occur can be covered and thereby the scheduling process can be performed without loss.

Since schedule decision device 1 computes effective degree scores based on the tolerance degree, an affordable schedule that takes deadlines into consideration can be generated.

Since schedule decision device 1 computes effective degree scores based on interruption times of tasks, a schedule can be generated that is nearly free of interruption of tasks.

Since schedule decision device 1 computes effective degree scores based on jitters (delay times), a schedule can be generated that is nearly free of delay.

Since schedule decision device 1 selects a candidate having the maximum effective degree score as the optimum candidate, schedule decision device 1 can decide one candidate by using simple method.

(Second Embodiment)

With reference to FIG. 15 to FIG. 20, a second embodiment according to this embodiment will be described. A schedule decision device according to this embodiment has the same structure as that of the schedule decision device according to the first embodiment except that the former can more effectively perform the candidate generation process than the latter.

Figure 15:
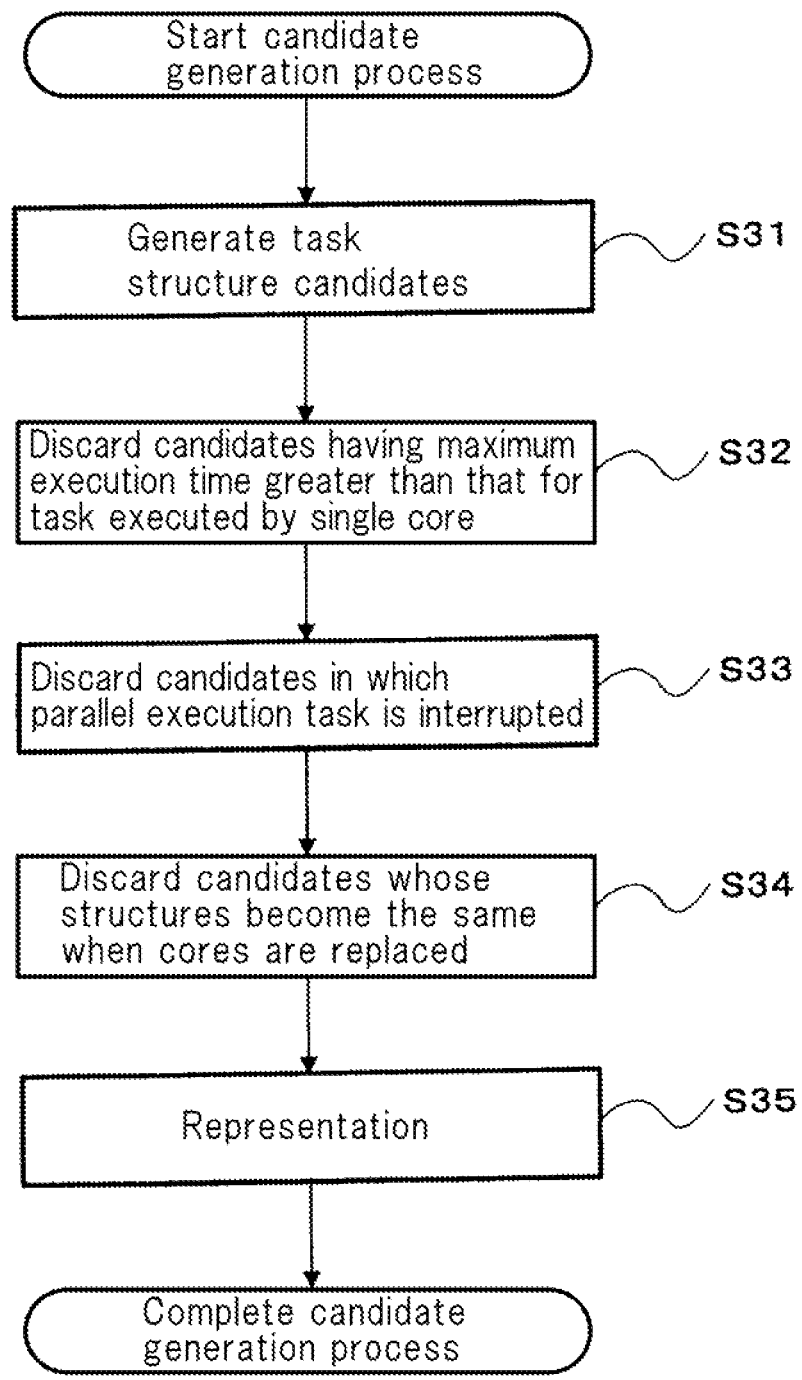
[FIG. 15] is a flow chart showing a candidate generation process according to a second embodiment of the present invention.

FIG. 15 is a flow chart showing a candidate generation process according to this embodiment. Referring to the drawing, candidate generation section 13 generates task structure candidates (at step S31) and then rules out (discards) candidates having a maximum execution time that is greater than that for a task executed by a single core (at step S32). In this embodiment, a task is executed in parallel such that the maximum execution time of the task becomes shorter than that for which the task is executed by a single core.

Then, candidate generation section 13 discards candidates in which a parallel execution task is interrupted (at step S33). In this embodiment, because of the restriction of the dependencies among sub tasks, while a parallel execution task (Task 0) is being interrupted, it is difficult to execute another task (Task 1).

Candidate generation section 13 also discards candidates whose structures become the same when cores are replaced (at step S34). This is because, in this embodiment, core 0 and core 1 are processing devices of the same type. After step S34, schedule decision device 1 executes step S35.

Figure 16:
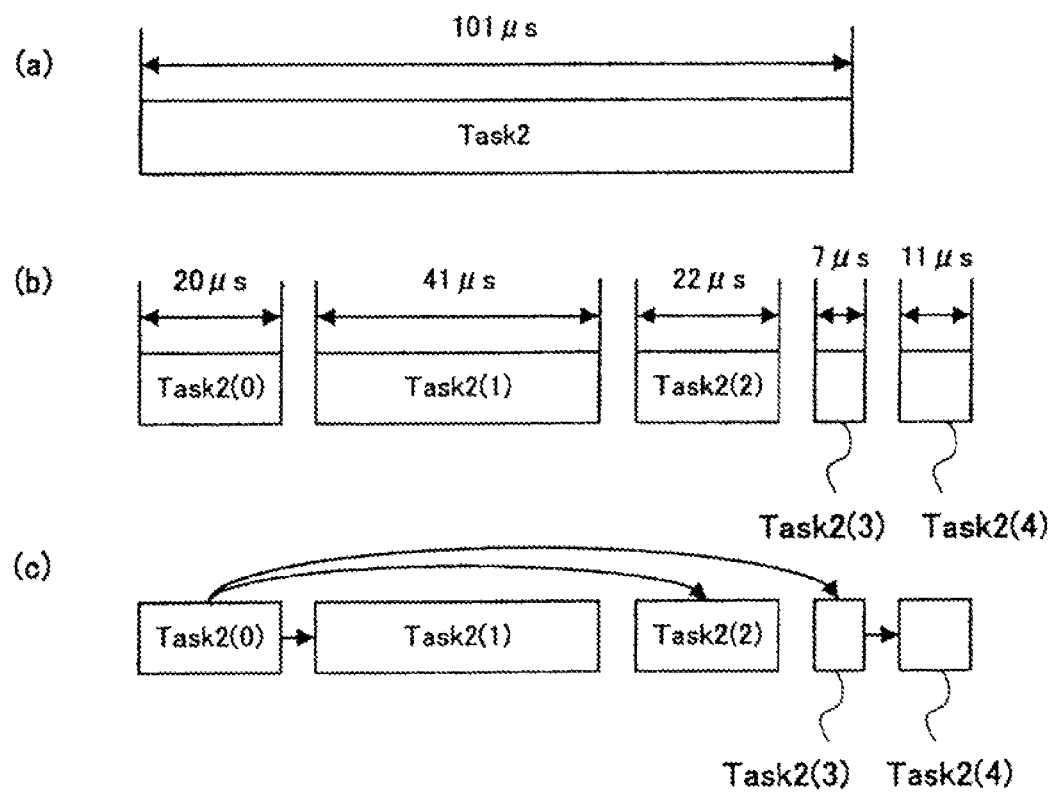
[FIG. 16](a) is a schematic diagram showing a shape of a parallel execution task according to the second embodiment of the present invention. (b) is a schematic diagram showing shapes of sub tasks according to the second embodiment of the present invention. (c) is a schematic diagram showing dependencies among sub tasks according to the second embodiment of the present invention.

Next, with reference to FIG. 16 to FIG. 20, an exemplary operation of schedule decision device 1 according to this embodiment will be described. As shown in FIG. 16 (*a*), the case in which Task 2 having a maximum execution time of 101 μs is scheduled for scheduling will be considered.

As shown in FIG. 16 (*b*), schedule decision device 1 divides Task 2 into a plurality of sub tasks having 20 μs, 41 μs, 22 μs, 7 μs, and 11 μs (Task 2[0], Task 2[1], Task 2[3], and Task 2[4]).

As shown in FIG. 16 (*c*), schedule decision device 1 obtains the dependencies among the sub tasks. In this embodiment, it is necessary to execute Task 2[0], followed by Task 2[1], Task 2[2], and Task 2[3] and then Task 2[3] followed by Task 2[4].

Figure 17:
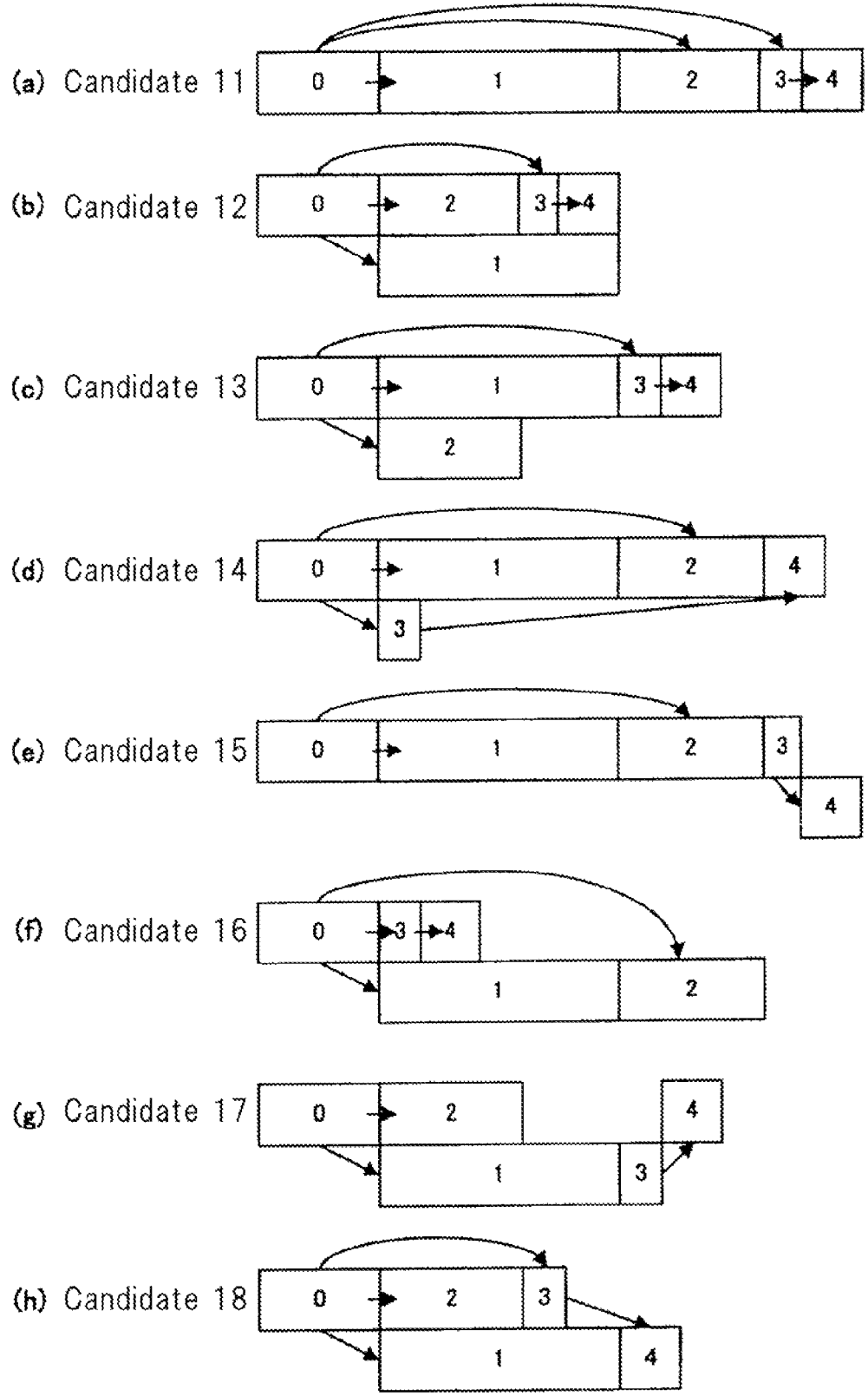
[FIG. 17](a) is a schematic diagram showing a shape of a task structure candidate according to the second embodiment of the present invention. (b) is a schematic diagram showing a shape of a task structure candidate according to the second embodiment of the present invention. (c) is a schematic diagram showing a shape of a task structure candidate according to the second embodiment of the present invention. (d) is a schematic diagram showing a shape of a task structure candidate according to the second embodiment of the present invention. (e) is a schematic diagram showing a shape of a task structure candidate according to the second embodiment of the present invention. (f) is a schematic diagram showing a shape of a task structure candidate according to the second embodiment of the present invention. (g) is a schematic diagram showing a shape of a task structure candidate according to the second embodiment of the present invention. (h) is a schematic diagram showing a shape of a task structure candidate according to the second embodiment of the present invention.
Figure 18:
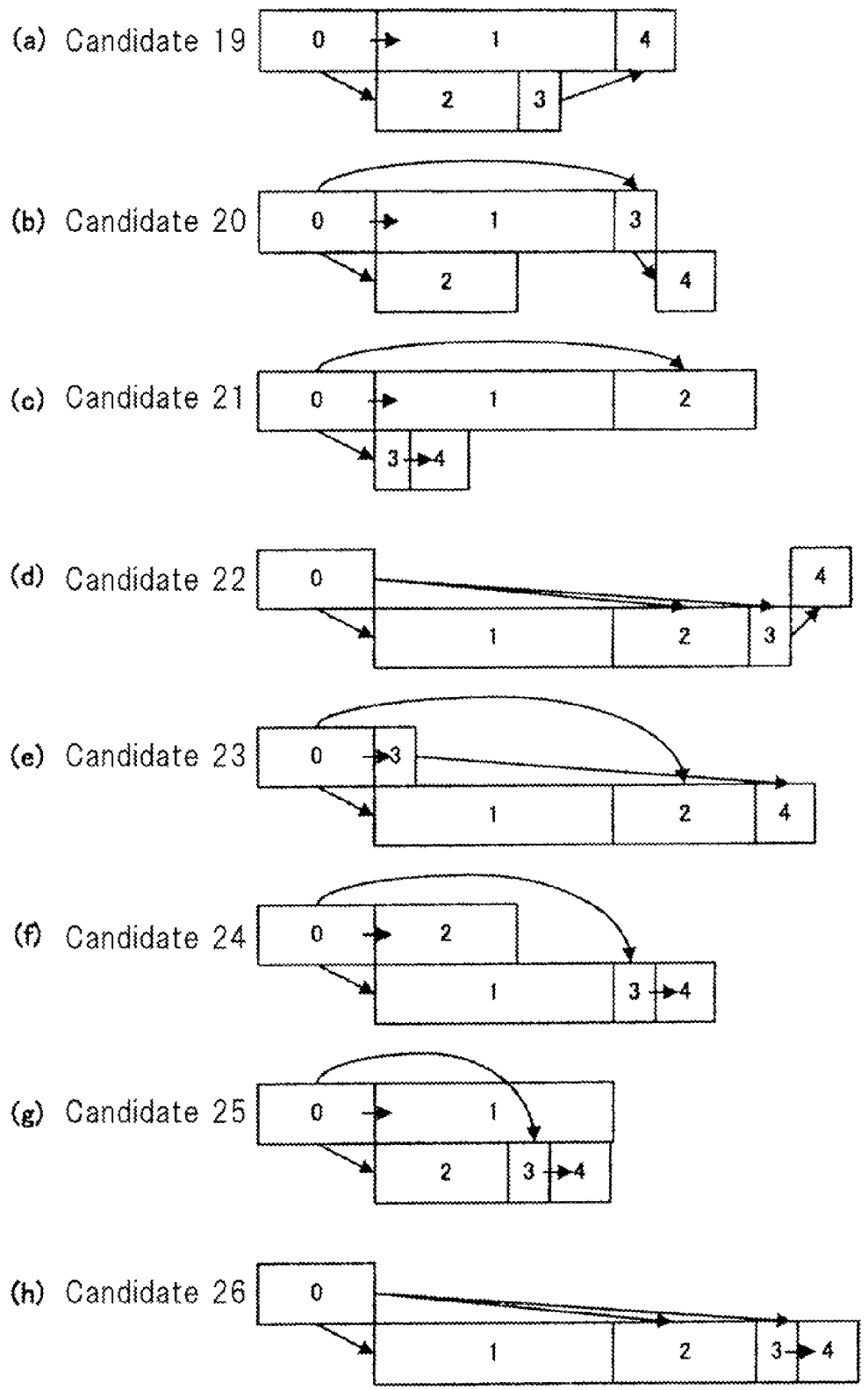
[FIG. 18](a) is a schematic diagram showing a shape of a task structure candidate according to the second embodiment of the present invention. (b) is a schematic diagram showing a shape of a task structure candidate according to the second embodiment of the present invention. (c) is a schematic diagram showing a shape of a task structure candidate according to the second embodiment of the present invention. (d) is a schematic diagram showing a shape of a task structure candidate according to the second embodiment of the present invention. (e) is a schematic diagram showing a shape of a task structure candidate according to the second embodiment of the present invention. (f) is a schematic diagram showing a shape of a task structure candidate according to the second embodiment of the present invention. (g) is a schematic diagram showing a shape of a task structure candidate according to the second embodiment of the present invention. (h) is a schematic diagram showing a shape of a task structure candidate according to the second embodiment of the present invention.

As shown in FIG. 17 (*a*) to (*h*) and FIG. 18 (*a*) to (*h*), schedule decision device 1 generates task structure candidates 11 to 26 that satisfy the dependencies. Then, as shown in FIG. 19, schedule decision device 1 generates a table that presents the results of scheduling.

In candidate 15 shown in FIG. 17 (*e*), the sub tasks are executed in the sequence of Task 2[0], Task 2[1], Task 2[2], and Task 2[3] by core 0 and when Task 2[3] is completed, Task 2[4] is started by core 1. As a result, since the maximum execution time of Task 2 executed in parallel (101 μs) is equal to the maximum execution time of Task 2 that is executed by a single core (101 μs), schedule decision device 1 discards candidate 15 (at step S32). Due to the same reason, candidate 26 shown in FIG. 18 (*h*) is also discarded.

In candidate 17 shown in FIG. 17 (*g*), when Task 2[0] is completed by core 0, Task 2[2] is started by core 0 and Task 2[1] and Task 2[3] are started by core 1. Thereafter, when Task 2[3] is completed, Task 2[4] is started by core 0. Since the maximum execution time of Task 2[2] (22 μs) is shorter than the maximum execution time of Task 2[1] (41 μs), Task 2 is interrupted in core 0. Thus, schedule decision device 1 discards candidate 17 (at step S33). Due to the same reason, candidate 20 and candidate 22 shown in FIGS. 18 (*b*) and (*d*), respectively, are also discarded.

Figure 20:
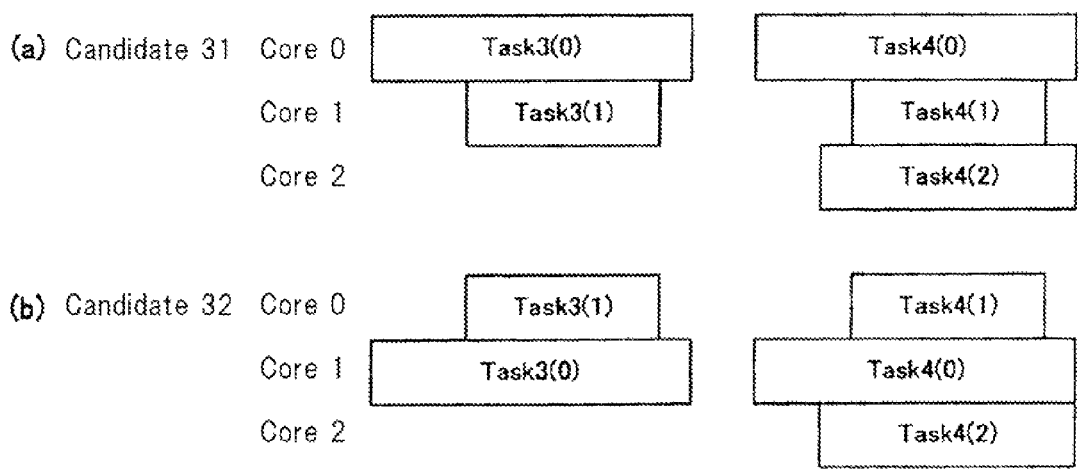
[FIG. 20](a) is a schematic diagram showing a shape of a task structure candidate according to the second embodiment of the present invention. (b) is a schematic diagram showing a shape of a task structure candidate according to the second embodiment of the present invention.

FIGS. 20 (*a*) and (*b*) are schematic diagrams showing exemplary candidates whose structures become the same when cores are replaced. In candidate 31 shown in (a) of the drawing, Task 3[0] and Task 4[0] are executed by core 0, Task 3[1] and Task 4[1] are executed by core 1, and Task 4[2] is executed by core 2. In candidate 32 shown in (b) of the drawing, Task 3[1] and Task 4[1] are executed by core 0, Task 3[0] and Task 4[0] are executed by core 1, and Task 4[2] is executed by core 2. When the processes of core 0 and core 1 are replaced, since the structures become the same, schedule decision device 1 discards candidate 31 or candidate 32 (at step S34).

As described above, according to this embodiment, since schedule decision device 1 rules out candidates having a maximum execution time greater than that for a task executed by a single core, only schedules whose execution times become short by parallelization can be generated.

In addition, since schedule decision device 1 rules out candidates in which tasks are interrupted, while a parallel execution task is being interrupted, another task can be prevented from being executed.

Since schedule decision device 1 rules out candidates whose structures become the same when cores are replaced, if a schedule for a system having a plurality of cores of the same type is generated, waste processes can be omitted.

(Third Embodiment)

Figure 21:
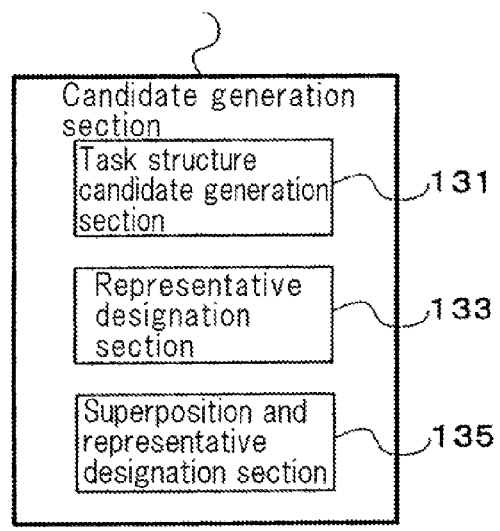
[FIG. 21] is a block diagram showing a structure of a candidate generation section according to a third embodiment of the present invention.

With reference to FIG. 21 to FIG. 33, a third embodiment of the present invention will be described. FIG. 21 is a block diagram showing a structure of candidate generation section 13 according to this embodiment. Referring to the drawing, schedule decision device 1 according to this embodiment has the same structure as that of schedule decision device 1 according to the first embodiment except that the former also has superposition and representative designation section 135.

Task structure candidate generation section 131 generates task structure candidates so as to satisfy their dependencies and rules out candidates in which a task is interrupted in the middle of the execution. Representative designation section 133 causes individual task structure candidates to be represented. Details of a superposing method will be described later.

Superposition and representative designation section 135 categorizes task structure candidates as a plurality of groups based on a predetermined criteria and superposes candidates that belong to each group. Then, superposition and representative designation section 135 causes superposed candidates to be represented.

As an exemplary group categorization method, schedule decision device 1 arranges task structure candidates in the sequence of maximum execution times of one core and categorizes them such that the numbers of candidates that belong to the individual groups become nearly the same.

As an alternative categorizing method, schedule decision device 1 arranges task structure candidates in the sequence of maximum execution times of one core and categorizes candidates covered by groups such that the maximum execution times of the core nearly become equal.

As a further alternative categorizing method, schedule decision device 1 arranges task structure candidates in the sequence of maximum execution times of one core and computes the differences of the maximum execution times of adjacent candidates. Then, schedule decision device 1 categorizes task structure candidates as a plurality of groups such that the candidates are divided at positions where the division excessively becomes large.

As a further more alternative categorizing method, schedule decision device 1 categorizes candidates such that the offsets in each group fall in a predetermined range. Schedule decision device 1 may be able to categorize candidates by combining any two methods using the number of candidates, range of maximum execution times, differences, and offsets.

Scheduling execution section 15 executes scheduling for superposed candidates and effective degree score computation section 17 computes effective degree scores of the individual superposed schedule candidates. Then, scheduling execution section 15 executes scheduling for individual task structure candidates that belong to a superposed candidate having the highest effective degree score and effective degree score computation section 17 computes the effective degree scores of the individual scheduling candidates.

Figure 22:
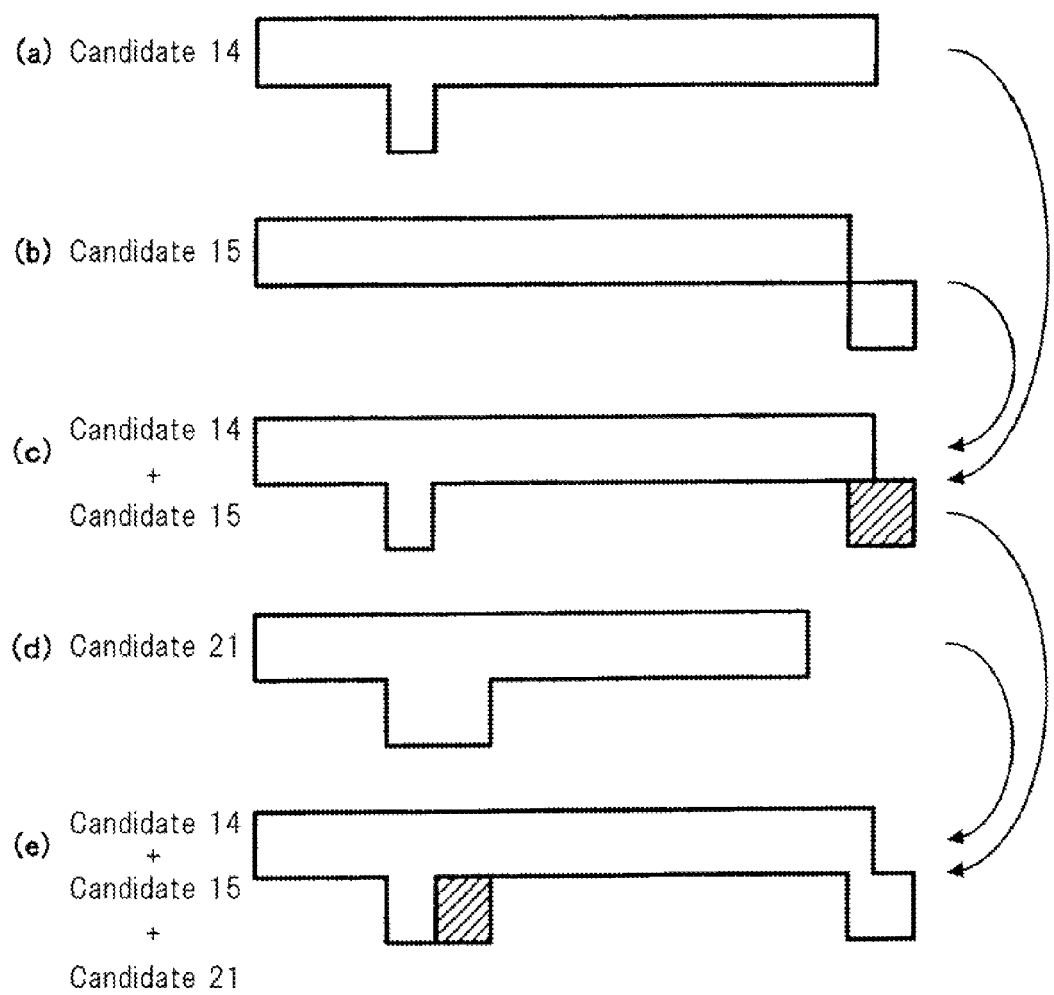
[FIG. 22](a) is a schematic diagram showing a shape of a task structure candidate according to the third embodiment of the present invention. (b) is a schematic diagram showing a shape of a task structure candidate according to the third embodiment of the present invention. (c) is a schematic diagram showing a shape of a task structure candidate according to the third embodiment of the present invention. (d) is a schematic diagram showing a shape of a task structure candidate according to the third embodiment of the present invention. (e) is a schematic diagram showing a shape of a task structure candidate according to the third embodiment of the present invention.

Referring to FIG. 22, the superposing method will be described. FIG. 22 (a) to (e) are schematic diagrams serving to describe the superposing method.

The superposing method will be described in detail. Superposition and representative designation section 135 selects any two task structure candidates from among those that belong to a group. Then, superposition and representative designation section 135 compares these task structure candidates and adds (superposes) a duration for which the execution duration of one task structure candidate does not match the execution duration of the other task structure candidate to the other task structure candidate. Superposition and representative designation section 135 compares the task structure candidate to which the no-match duration has been added with all other task structure candidates that have not been compared and continues such an adding process if there is no-match duration.

For example, the case in which sub task structure candidates 14, 15, and 21 shown in FIGS. 22 (a), (b), and (d) are superposed will be considered. First, superposition and representative designation section 135 compares sub task structure candidate 14 shown in (a) of the drawing with sub task structure candidate 15 shown in (c) of the drawing. As shown in (c) of the drawing, superposition and representative designation section 135 adds (superposes) a duration for which the execution duration of sub task structure candidate 15 does not match the execution duration of sub task structure candidate 14 to sub task structure candidate 14. In (c) of the drawing, a hatched portion represents the added portion.

Thereafter, superposition and representative designation section 135 compares the superposed sub task structure candidate with sub task structure candidate 21 shown in FIG. 22 (d). As shown in (e) of the drawing, superposition and representative designation section 135 adds a duration that does not match the superposed candidate in the execution duration of sub task structure 15 to the superposed sub task structure candidate. In (e) of the drawing, a hatched portion represents the added portion.

Figure 23:
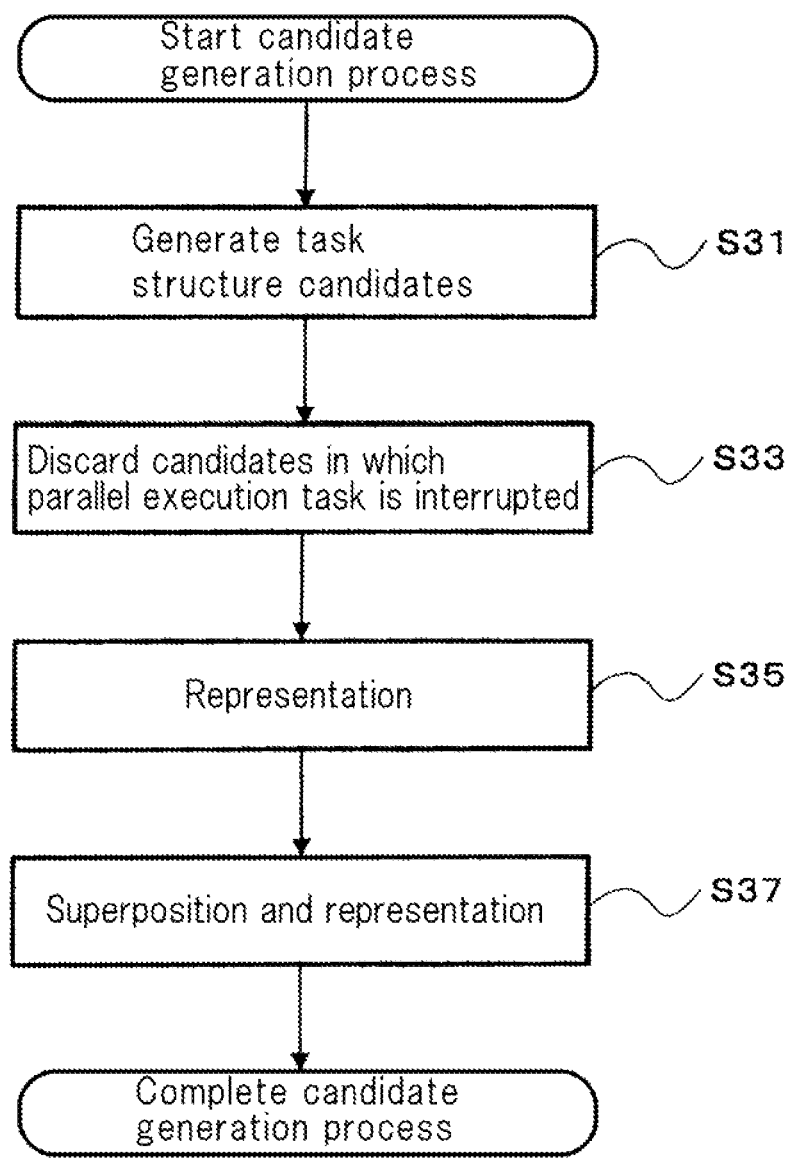
[FIG. 23] is a flow chart showing a candidate generation process according to the third embodiment of the present invention.

FIG. 23 is a flow chart showing an candidate generation process according to this embodiment. Referring to the drawing, task structure candidate generation section 131 generates task structure candidates (at step S31) and discards candidates in which a parallel execution task is interrupted (at step S33). Representative designation section 133 causes task structure candidates to be represented (at step S35). Superposition section 135 categorizes task structure candidates as a plurality of groups based on a predetermined criteria and superposes candidates that belong to each group. Then, superposed candidates are represented as superposed candidates (at step S37). After step S35, candidate generation section 13 completes the candidate generation process.

Figure 24:
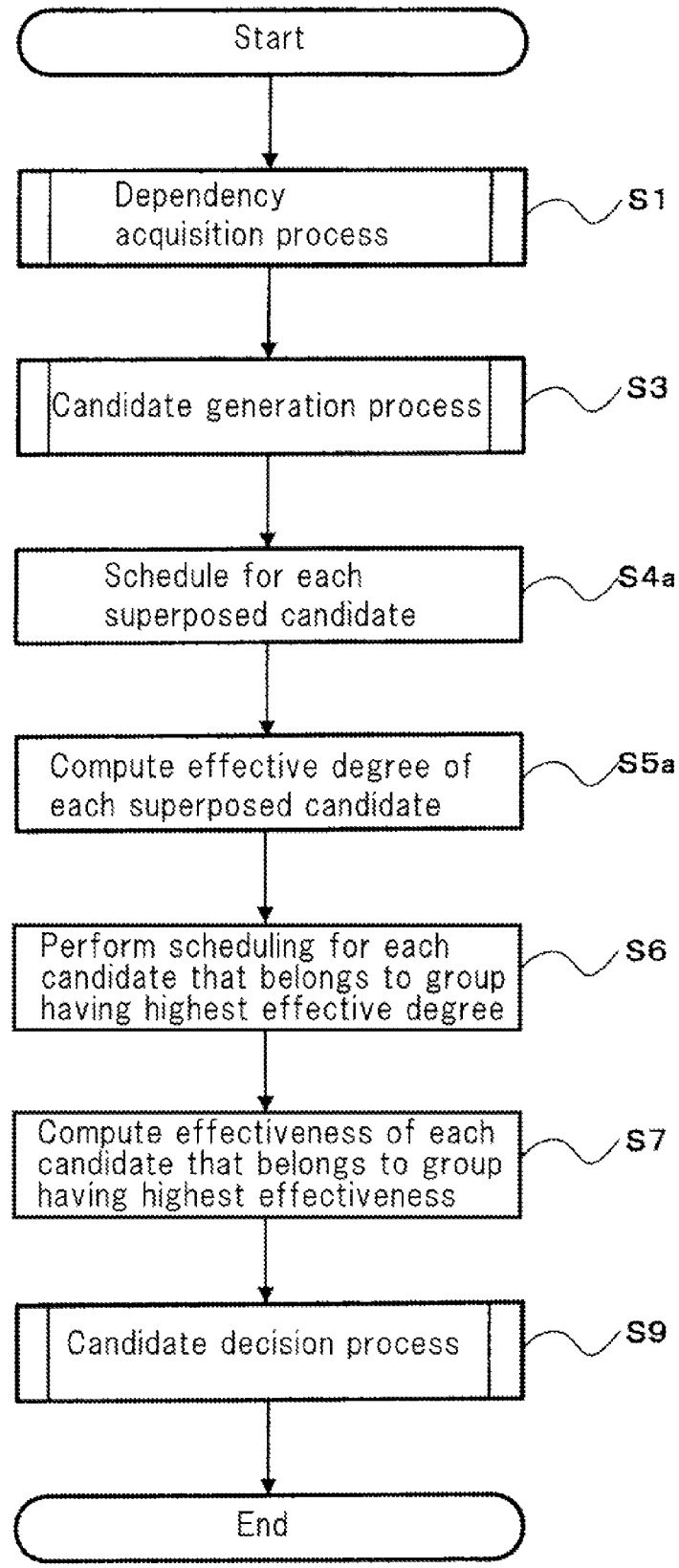
[FIG. 24] is a flow chart showing a schedule decision device according to the third embodiment of the present invention.

FIG. 24 is a flow chart showing an operation of the schedule decision device according to this embodiment. Referring to this drawing, after step S3, scheduling execution section 15 executes scheduling for the superposed candidates (at step 4a) and effective degree score computation section 17 computes effective degree scores of the individual superposed schedule candidates (at step S5a). Then, scheduling execution section 15 executes scheduling for the individual task structure candidates that belong to a superposed candidate having the highest effective degree score (at step S6) and effective degree score computation section 17 computes the effective degree scores of the individual schedule candidates (at step S7).

With reference to FIG. 25 to FIG. 27, first exemplary operation results of schedule decision device 1 according to this embodiment will be described.

FIG. 25 is a schematic diagram showing exemplary results of categorization of task structure candidates such that the number of candidates that belong to individual groups become equal. The drawing shows that only candidates in which a task is interrupted in the middle of the execution are ruled out from the schedule results shown in FIG. 19. Referring to the drawing, superposition and representative designation section 135 arranges the results of scheduling in the sequence of the maximum execution times of core 0. Then, superposition and representative designation section 135 categorizes candidates such that the numbers of candidates that belong to individual groups become equal. For example, candidates are categorized as groups such that the number of candidates that belong to each group becomes 3. As a result, candidates 14, 15, and 21 belong to the same group, (A).

FIG. 26 is a schematic diagram showing exemplary results of categorization of task structure candidates such that the range of execution times of candidates that belong to each group falls within a predetermined value. Referring to the drawing, superposition and representative designation section 135 categorizes individual candidates as group (A) in which the maximum execution time of core 0 is less than 100 μs and equal to or greater than 75 μm, group (B) in which the maximum execution time is less than 75 μs and equal to or greater than 60 μs, group (C) in which the maximum execution time is less than 60 μs and equal to or greater than 40 μs, and group (D) in which the maximum execution time is less than 40 μm.

FIG. 27 is a schematic diagram showing exemplary results of divisions at positions in which the difference between the maximum execution times of adjacent candidates becomes a predetermined value or greater. Referring to the drawing, superposition and representative designation section 135 divides individual candidates at positions where the difference between adjacent candidates becomes 10 µs or greater and categorizes the individual candidates in this manner.

With reference to FIG. 28 to FIG. 33, second exemplary operation results of schedule decision device 1 according to this embodiment will be described.

Figure 28:
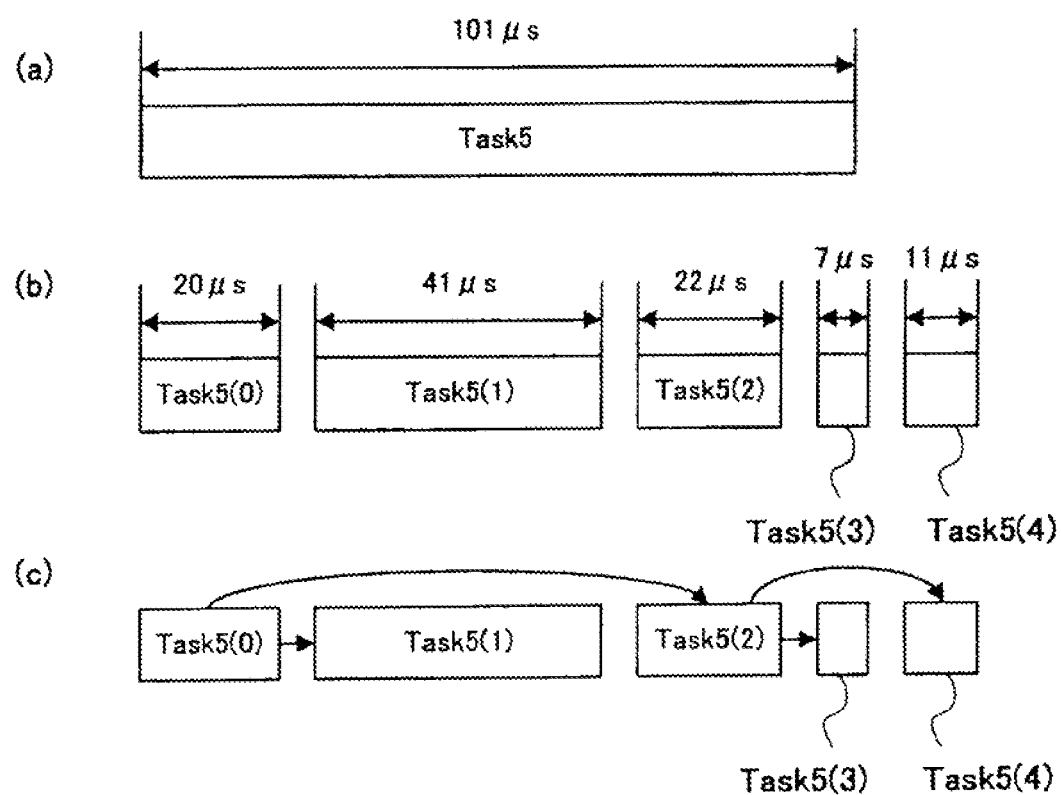
[FIG. 28](a) is a schematic diagram showing a shape of a parallel execution task according to the third embodiment of the present invention. (b) is a schematic diagram showing shapes of sub tasks according to the third embodiment of the present invention. (c) is a schematic diagram showing dependencies among sub tasks according to the third embodiment of the present invention.

As shown in FIG. 28 (*a*), the case in which Task 5 having a maximum execution time of 101 µs is scheduled will be considered. As shown in (b) of the drawing, schedule decision device 1 divides Task 5 into a plurality of sub tasks of 20 µs, 41 µs, 22 µs, 7 µs, and 11 µs (Task 5[0], Task 5[1], Task 2[3], and Task 5 [4]).

Then, as shown in FIG. 28 (*c*), schedule decision device 1 obtains the dependencies among sub tasks. In this embodiment, it is necessary to execute Task 5[0] followed by Task 2[1] and Task 2[2], followed by Task 2[3] and Task 2[4].

Figure 29:
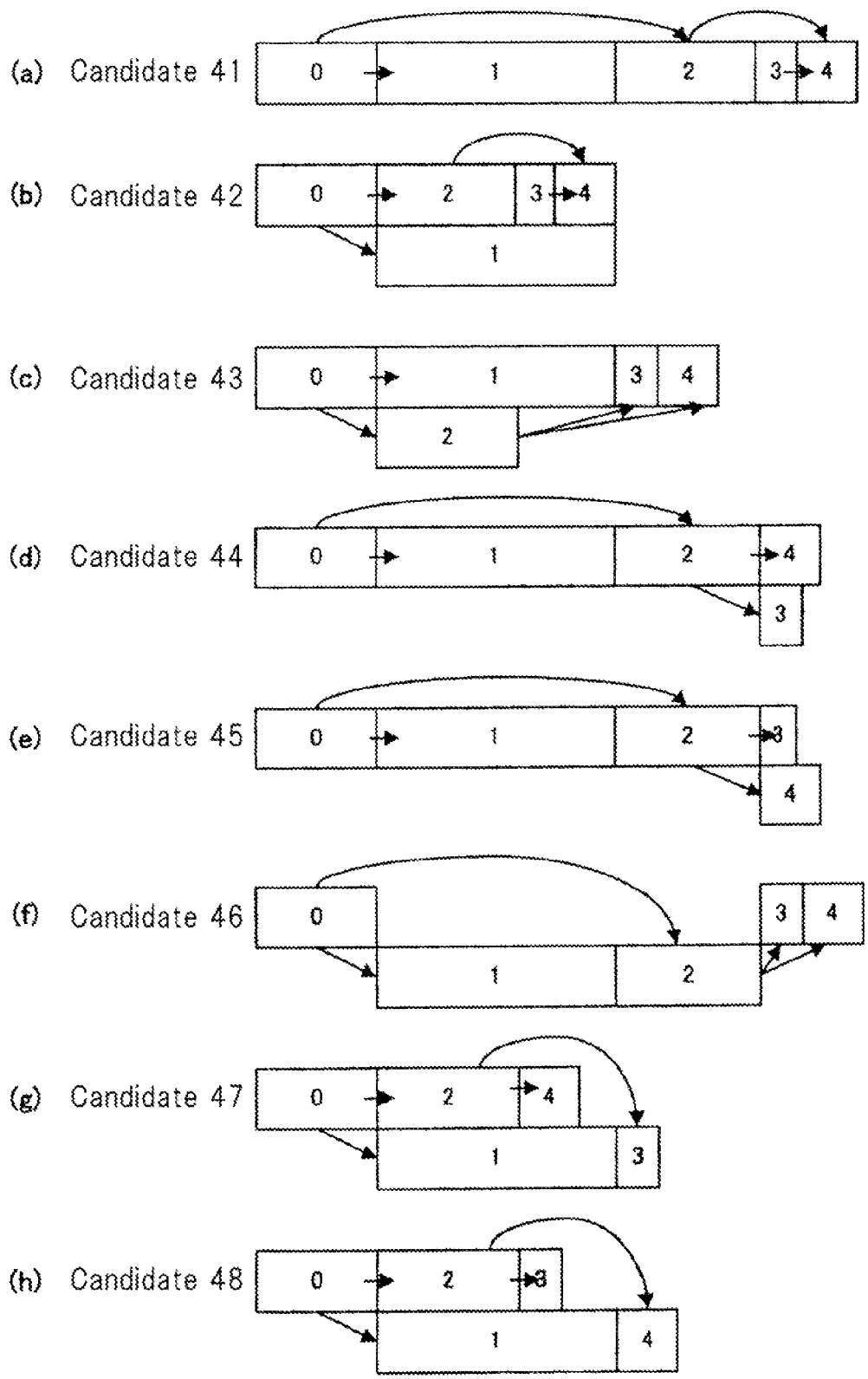
[FIG. 29](a) is a schematic diagram showing a shape of a task structure candidate according to the third embodiment of the present invention. (b) is a schematic diagram showing a shape of a task structure candidate according to the third embodiment of the present invention. (c) is a schematic diagram showing a shape of a task structure candidate according to the third embodiment of the present invention. (d) is a schematic diagram showing a shape of a task structure candidate according to the third embodiment of the present invention. (e) is a schematic diagram showing a shape of a task structure candidate according to the third embodiment of the present invention. (f) is a schematic diagram showing a shape of a task structure candidate according to the third embodiment of the present invention. (g) is a schematic diagram showing a shape of a task structure candidate according to the third embodiment of the present invention. (h) is a schematic diagram showing a shape of a task structure candidate according to the third embodiment of the present invention.
Figure 30:
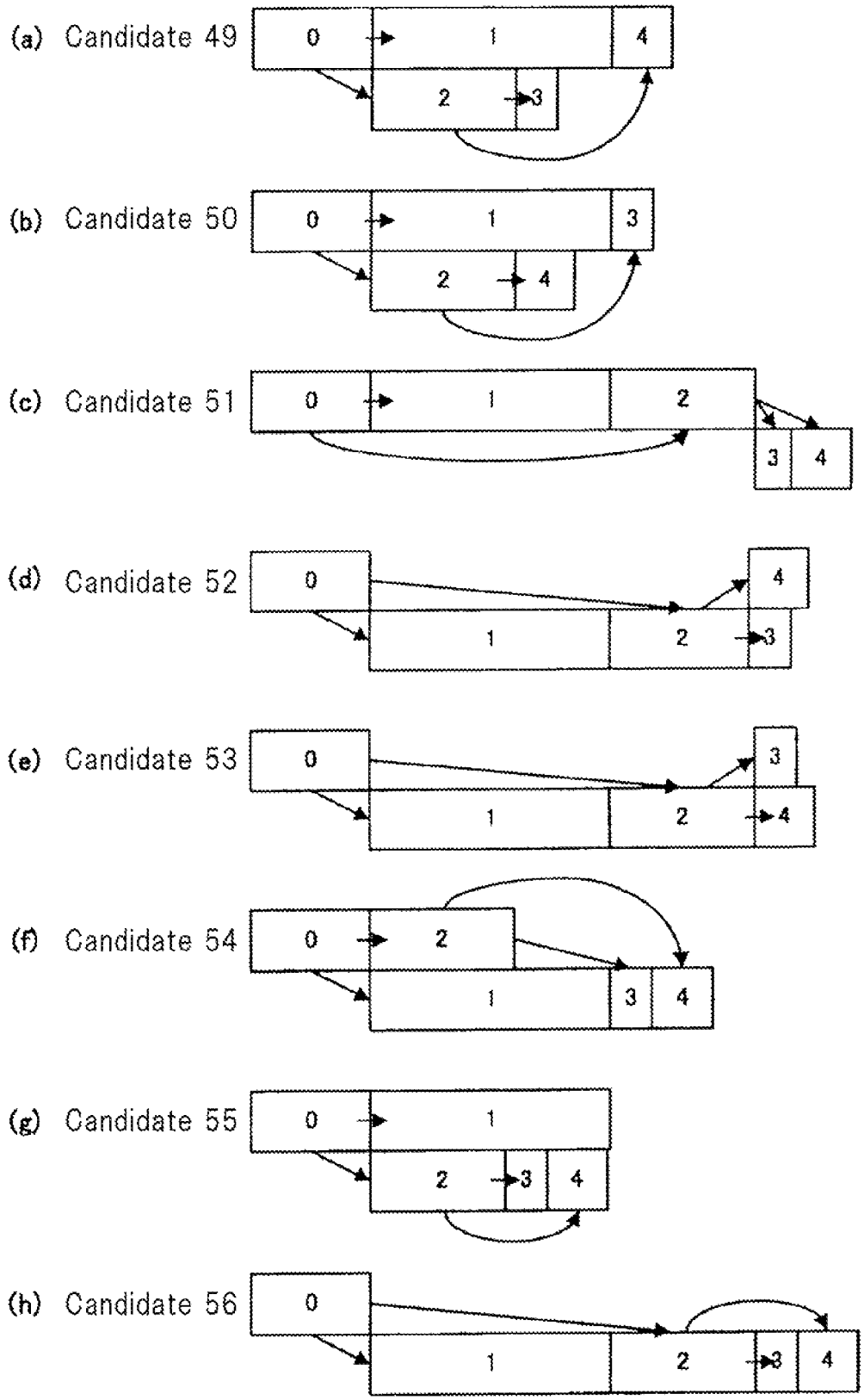
[FIG. 30](a) is a schematic diagram showing a shape of a task structure candidate according to the third embodiment of the present invention. (b) is a schematic diagram showing a shape of a task structure candidate according to the third embodiment of the present invention. (c) is a schematic diagram showing a shape of a task structure candidate according to the third embodiment of the present invention. (d) is a schematic diagram showing a shape of a task structure candidate according to the third embodiment of the present invention. (e) is a schematic diagram showing a shape of a task structure candidate according to the third embodiment of the present invention. (f) is a schematic diagram showing a shape of a task structure candidate according to the third embodiment of the present invention. (g) is a schematic diagram showing a shape of a task structure candidate according to the third embodiment of the present invention. (h) is a schematic diagram showing a shape of a task structure candidate according to the third embodiment of the present invention.

As shown in FIGS. 29 (*a*) to (*h*) and FIGS. 30 (*a*) to (*h*), schedule decision device 1 generates task structure candidates 41 to 56 that satisfy the dependencies.

Then, as shown in FIG. 31, schedule decision device 1 generates a table that presents results of scheduling. In this embodiment, candidates in which a task is interrupted in the middle of the execution are ruled out (48, 52, and 53).

FIG. 32 and FIG. 33 are schematic diagrams showing results in which schedule decision device 1 categorizes candidates using offsets and ranges of execution times. Referring to FIG. 32, schedule decision device 1 categorizes candidates having an offset of 20 (A, B) and a candidate having an offset of 83 (C) as different groups. Then, as shown in FIG. 33, schedule decision device 1 categorizes the candidates having an offset of 20 as group (A) in which the execution time of core 0 is 50 µs or greater and group B in which the execution time is less than 50 µs.

Alternatively, as shown in FIG. 33, schedule decision device 1 categorizes candidates as group (A) in which the execution time of core 0 is 60 µs or greater, group (B) in which the execution time is less than 60 µs and 40 µs or greater, and group (C) in which the execution time is less than 40 µs.

All or part of the flow charts shown in FIG. 11 to FIG. 15, FIG. 22, and FIG. 23 can be accomplished by executing a computer program.

As described above, according to this embodiment, since task structure candidates can be coarsely narrowed down using superposed candidates that have superposed task structure candidates and since their effective degree scores are computed for each task structure candidate that belongs to an optimum superposed candidate, a schedule can be optimized with a small search amount and an advanced automatic optimization system can be accomplished.

Since schedule decision device 1 categorizes candidates using at least one of the number of candidates, execution times, differences, and offsets, schedule decision device 1 can improve efficiency of optimization using a simple method.

(Fourth Embodiment)

Figure 34:
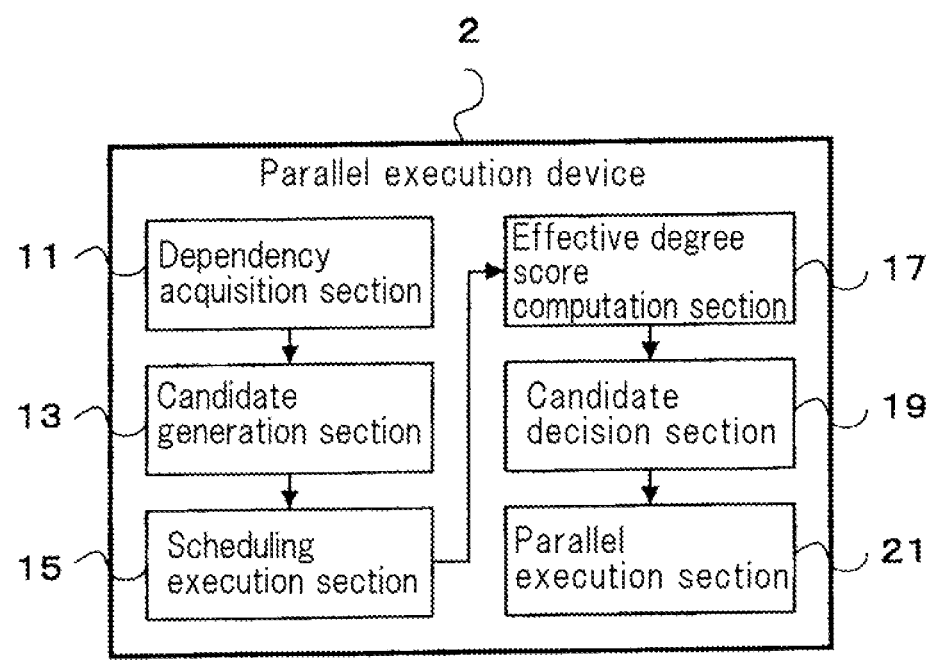
[FIG. 34] is a block diagram showing a structure of a parallel execution device according to a fourth embodiment of the present invention

With reference to FIG. 34, a fourth embodiment of the present invention will be described. The drawing is a block diagram showing a structure of parallel execution device 2 according to this embodiment. Referring to the drawing, parallel execution device 2 has the same structure as schedule decision device 1 according to the first embodiment except that the former also has parallel execution section 21.

Parallel execution section 21 causes a plurality of cores (not shown) to execute a task using schedule candidates decided by candidate decision section 19.

Although in this embodiment, structures of dependency acquisition section 11, candidate generation section 13, scheduling execution section 15, effective degree score computation section 17, and candidate decision section 19 are the same as those of dependency acquisition section 11 and so forth of the first embodiment, they may have the same structure as those of dependency acquisition section 11 and so forth of the second or third embodiment.

As described above, according to this embodiment, since parallel execution device 2 can execute a task in parallel according to an optimized schedule, the task can be effectively processed.

DESCRIPTION OF REFERENCE NUMERALS

1 Schedule decision device
2 Parallel execution device
11 Dependency acquisition section
13 Candidate generation section
15 Scheduling execution section
17 Score computation section
19 Candidate decision section
21 Parallel execution section
111 Task division section
113 Dependency graph generation section
131 Task structure candidate generation section
133 Representative designation section
135 Superposition section
191 Effective degree score comparison section
193 Storing section
a1, a2, a3 Task structure candidates
S1 to S9, S11, S13, S31 to S37, S91 to S97, S4*a*, S5*a* Steps

The invention claimed is:

1. A schedule decision device, comprising:
dependency acquisition means that acquires dependencies of execution sequences required for a plurality of sub tasks into which a first task has been divided;
candidate generation means that generates a plurality of sub task structure candidates that satisfy said dependencies acquired by said dependency acquisition means and for which a plurality of processing devices execute said plurality of sub tasks;
superimposition means that categorizes said plurality of sub task structure candidates generated by said candidate generation means as a plurality of groups, selects a first and second sub task structure candidate, compares the execution duration of the selected first and second sub task structure candidates, and adds a duration for which the executaion duration of one the first or second task structure candidate does not match the execution duration of the other task structure candidate to the other task structure candidate;
scheduling means that generates a plurality of the first schedule candidates by further assigning at least one second task to each of said sub task structure candidates generated by said superimposition means;
effective degree computation means that computes an effective degree that is realized by the effective degree of said first task and the effective degree of said second task for each of said plurality of the first schedule candidates generated by said scheduling means, wherein the computation means performs the step of:
computing the effective degree scores for the first and second task,
wherein the effective degree score for each task is computed according to the following formula:

$$\frac{(k3*(\text{average tolerance degree}))+}{(\text{execution period})} + \frac{(k5*(\text{average jitter}))}{(\text{execution period})},$$

where k3, k4, k5 are weighting coefficients, the average tolerance degree is an average value of tolerance degrees computed according to the following formula:

$$\frac{(\text{execution period})-(\text{task completion time})}{(\text{execution period})},$$

,the average interruption time is an average value of times for which a task is interrupted in each execution period, and the average jitter is an average value of delay times after a period starts until a task starts in each execution period, and computing the effective degree score of the plurality of sub task structure candidates, wherein the effective degree score of each sub task structure candidate is computed according to the following formula:

k1 * (effective degree score of first task)+$k2$* (effective degree score of second task), where k1 and k2 are weighting coefficients; and candidate decision means that decides a schedule candidate used for the executions of said first task and said second task from said plurality of the first schedule candidates based on said effective degrees computed by said effective degree computation means;

wherein said effective degree computation means further computes an effective degree of the respective first schedule candidates belonging to said respective sub task structure candidates generated by said superposition means, selects a group of sub task structure candidates from among said groups generated by the said superimposition means based on the computed effective degrees, and computes a plurality of second effective degree scores for a plurality of second schedule candidates corresponding to the sub task structure candidates that belong to the selected group;

said candidate decision means decides a second schedule candidate used for the executions of said first task and said second task from said plurality of second schedule candidates based on said second effective degrees computed by said effective degree computation means.

2. The schedule decision device according to claim 1, wherein said superposition means categorizes said plurality of sub task structure candidates such that a difference of the numbers of said sub task structure candidates that belong to the individual groups becomes a predetermined value or less.

3. The schedule decision device according to claim 1, wherein said superposition means computes a sum of execution times of sub tasks assigned to the predetermined processing devices for each of the sub task structure candidates and categorizes said plurality of candidates such that the sum computed for each of the sub task structure candidates that belong to each of the groups falls in a range that has been predetermined for each of the groups.

4. The schedule decision device according to claim 1, wherein said superposition means categorizes said plurality of sub task structure candidates such that sub task structure candidates having offsets that differ from each other by a predetermined value or greater belong to different groups.

* * * * *